United States Patent
Lavi et al.

(10) Patent No.: US 11,300,798 B2
(45) Date of Patent: Apr. 12, 2022

(54) GENERALLY V-SHAPED INTERFEROMETER FORMED FROM BEAMSPLITTER DEPLOYED BETWEEN GEOMETRICALLY SIMILAR PRISMS

(71) Applicant: Cl Systems (Israel) Ltd., Migdal Haemek (IL)

(72) Inventors: Moshe Lavi, Nofit (IL); Dario Cabib, Timrat (IL)

(73) Assignee: CI SYSTEMS (ISRAEL) LTD., Migdal Haemek (IL)

( * ) Notice: Subject to any disclaimer, the term of this patent is extended or adjusted under 35 U.S.C. 154(b) by 0 days.

(21) Appl. No.: 16/914,396

(22) Filed: Jun. 28, 2020

(65) Prior Publication Data

US 2020/0409162 A1  Dec. 31, 2020

Related U.S. Application Data

(60) Provisional application No. 62/867,260, filed on Jun. 27, 2019.

(51) Int. Cl.
G02B 27/12 (2006.01)
G02B 27/42 (2006.01)
G02B 27/09 (2006.01)

(52) U.S. Cl.
CPC ....... *G02B 27/123* (2013.01); *G02B 27/0972* (2013.01); *G02B 27/4233* (2013.01)

(58) Field of Classification Search
CPC .............. G02B 27/123; G02B 27/0972; G02B 27/4233
USPC .......................................................... 359/640
See application file for complete search history.

(56) References Cited

U.S. PATENT DOCUMENTS 5,327,413 A * 7/1994 Fritz .................... G11B 7/0908
250/201.5

* cited by examiner

*Primary Examiner* — Marin Pichler
*Assistant Examiner* — Mitchell T Oestreich
(74) *Attorney, Agent, or Firm* — Mark M. Friedman

(57) ABSTRACT

An optical device includes two prisms and a beamsplitter configuration. A first of the prisms has a first surface associated with a source and a second surface oblique to the first surface. A second of the prisms has a first surface associated with a detector and a second surface oblique to the first surface. The second surface of the first prism overlaps with the second surface of the second prism to define an interface region that partially extends along at least one of the second surfaces. The prisms are optically attached at the interface region, and the beamsplitter configuration overlies the interface region. A beam emitted by the source propagates through the prisms along two optical paths and reaches the detector as two coherent beams. Beams that propagate along the two optical paths are reflected from the beamsplitter configuration and transmitted by the beamsplitter configuration exactly once.

17 Claims, 9 Drawing Sheets

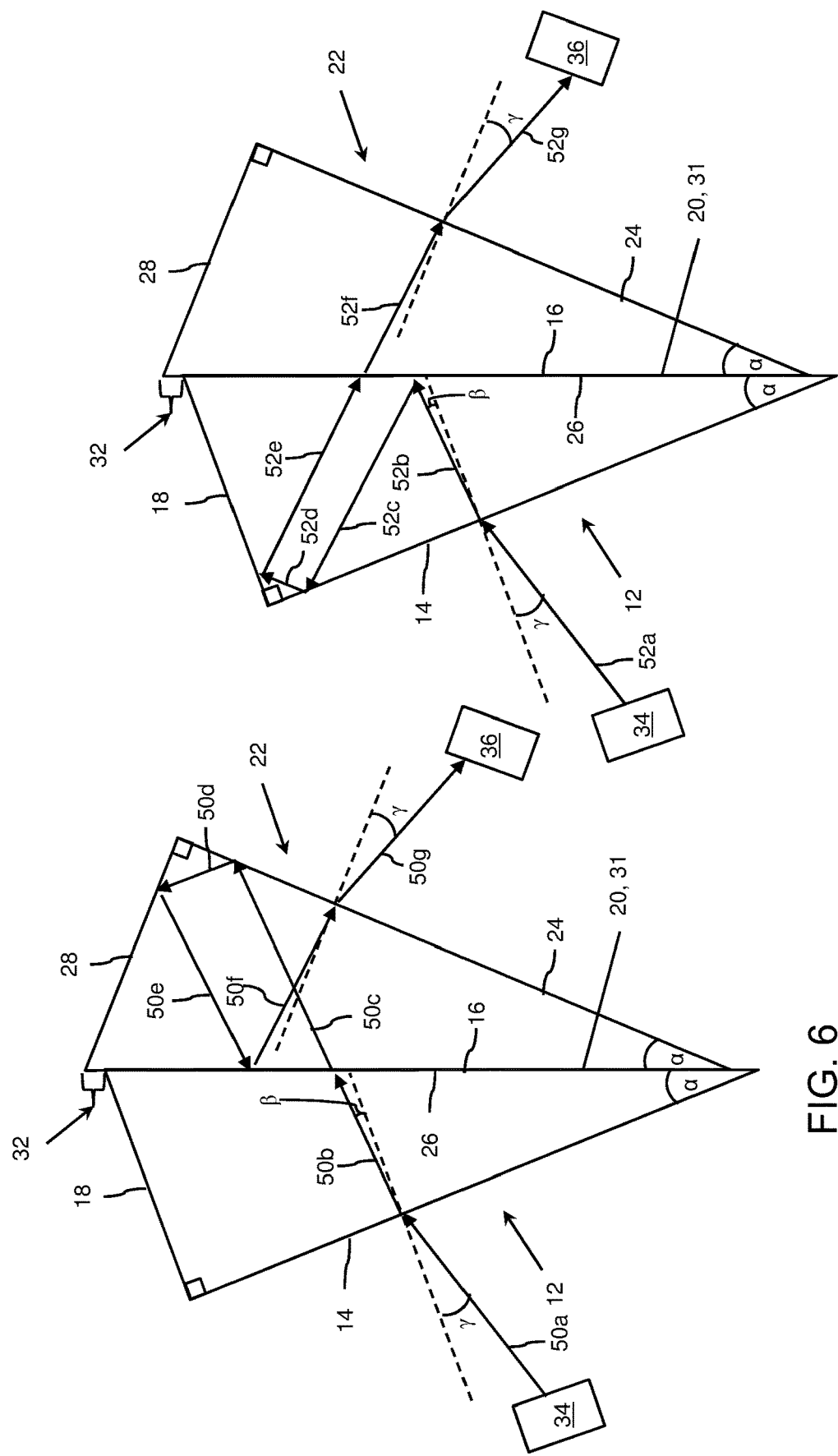

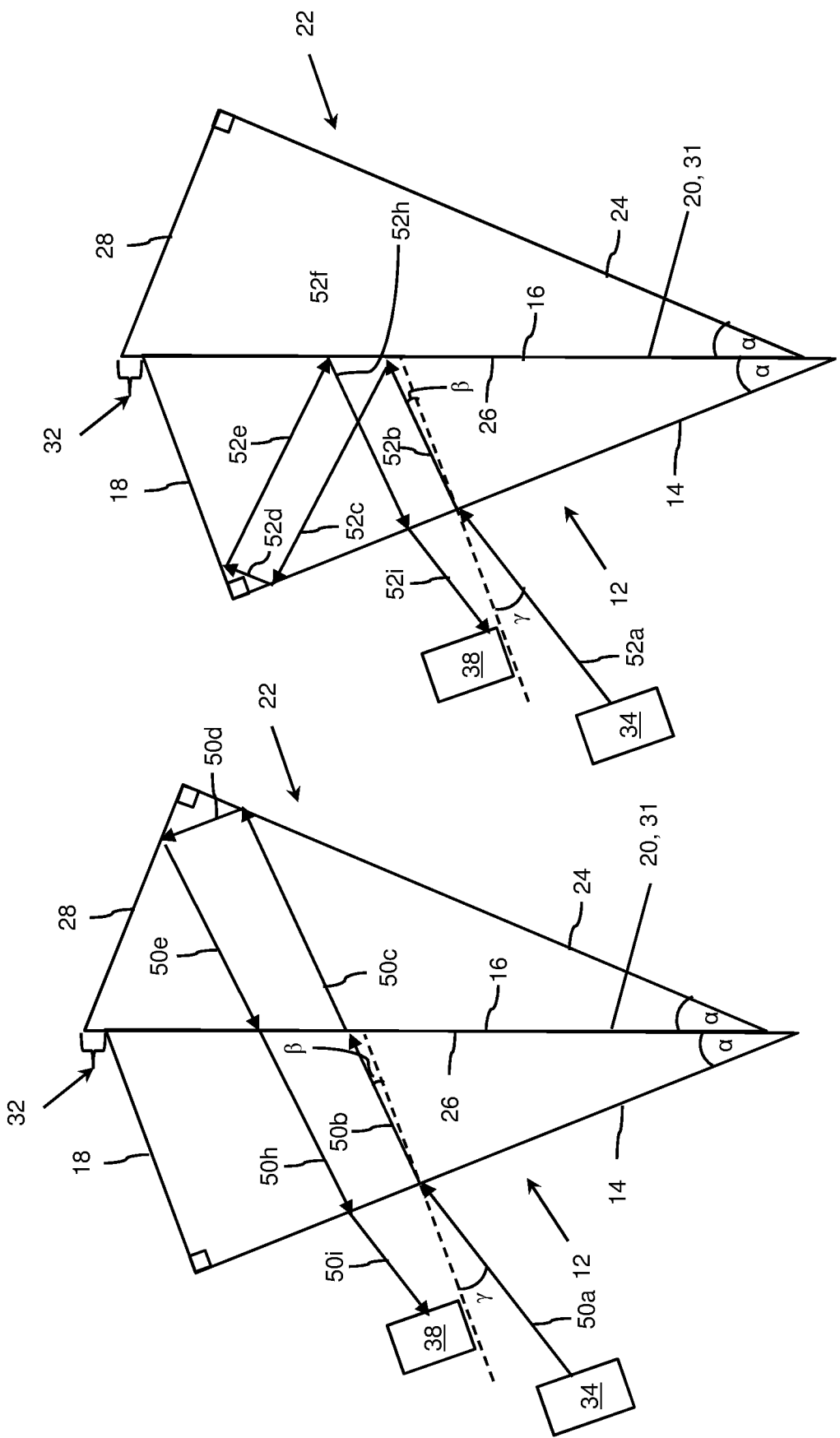

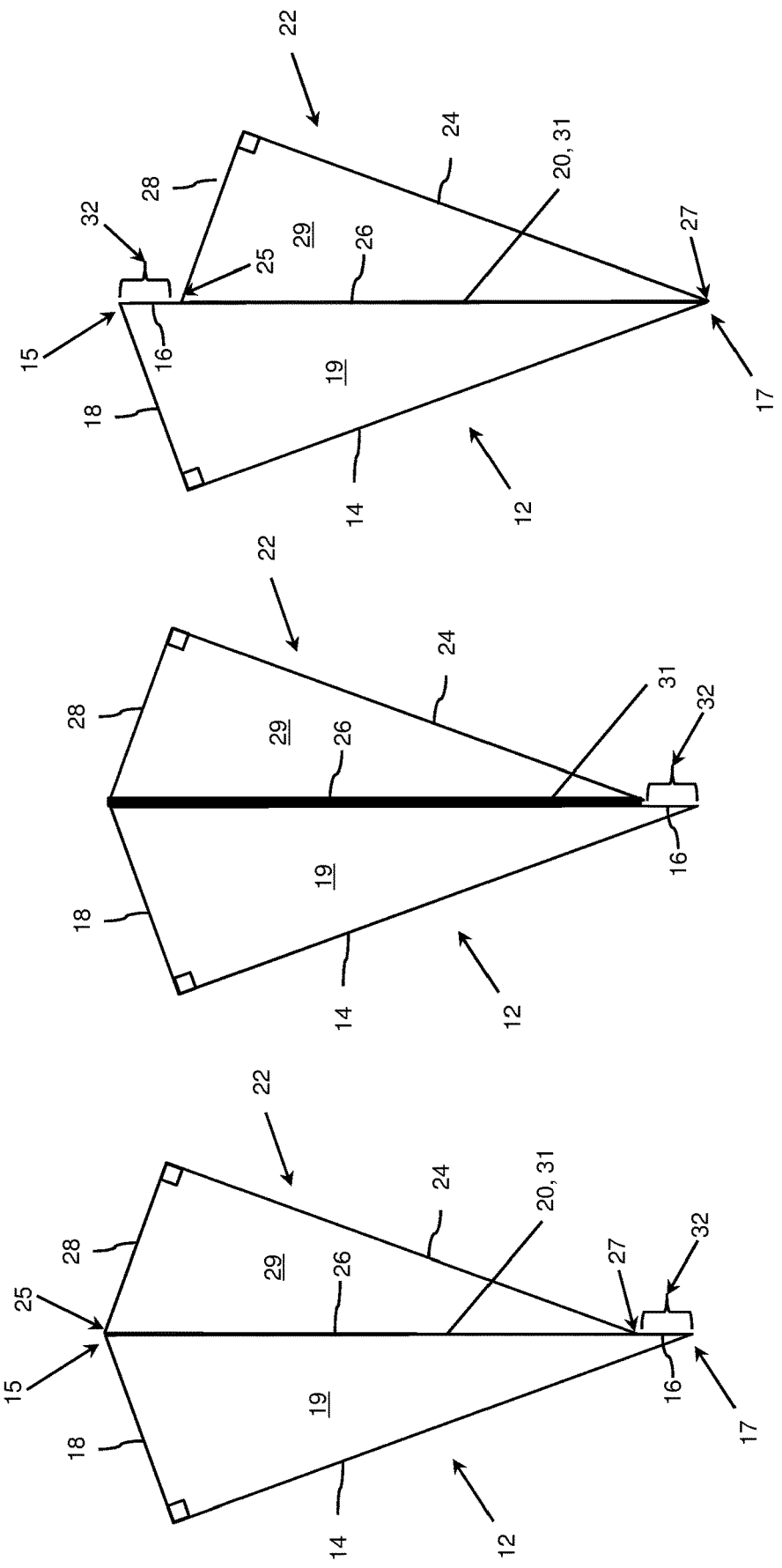

GENERALLY V-SHAPED INTERFEROMETER FORMED FROM BEAMSPLITTER DEPLOYED BETWEEN GEOMETRICALLY SIMILAR PRISMS

CROSS-REFERENCE TO RELATED APPLICATIONS

This application claims priority from U.S. Provisional Patent Application No. 62/867,260, filed Jun. 27, 2019, whose disclosure is incorporated by reference in its entirety herein.

TECHNICAL FIELD

The present invention relates to interferometric optical devices and systems.

BACKGROUND OF THE INVENTION

Interferometers are optical set-ups that are widely used in spectroscopic equipment, spectrometers and spectral imagers to measure the spectrum of radiation emitted by an object or source. In spectroscopic applications, the spectrum is generally used to analyze the physical and chemical characteristics of the object/source that emits the radiation. There are several known techniques that can be used to obtain similar information using different optical light manipulation methods, including, for example, filtering, dispersion, and diffraction through periodically treated optical elements.

SUMMARY OF THE INVENTION

The present invention is an interferometric optical device having a beamsplitter configuration deployed between two geometrically similar prisms, preferably two prisms that are offset one with respect to the other and not of the same size.

According to the teachings of an embodiment of the present invention, there is provided optical device. The optical device comprises: a prism assembly including: a first prism comprising a light-transmitting material having a plurality of surfaces including at least a first surface associated with a source of light and a second surface oblique to the first surface, and a second prism comprising a light-transmitting material having a plurality of surfaces including at least a first surface associated with a detector and a second surface oblique to the first surface of the second prism, the second surface of the first prism is in overlapping relation with the second surface of the second prism to define an interface region of a given length that partially extends along at least one of the second surface of the first prism or the second surface of the second prism, and the first and second prisms are optically attached at the interface region; and a beamsplitter configuration overlying the interface region, such that an incoming light beam emitted by the source of light propagates through the first and second prisms along a first optical path and a second optical path so as to reach the detector as two coherent light beams, and such that light beams that propagate from the source of light to the detector along each of the first and second optical paths are reflected from the beamsplitter configuration and transmitted by the beamsplitter configuration exactly once.

Optionally, a difference between a length of the first and second optical paths varies as a function of an angle of incidence of the incoming light beam due at least in part to the length of the interface region.

Optionally, the source of light is a remote scene that emits radiation.

Optionally, the source of light includes an object that emits light waves in response to illumination by a light source.

Optionally, the source of light includes an illumination arrangement, corresponding to the source of light associated with the second surface of the first prism, that produces beams of light.

Optionally, the optical device further comprises: an illumination arrangement corresponding to the source of light associated with the first surface of the first prism that produces beams of light.

Optionally, the optical device further comprises: a detector arrangement corresponding to the detector associated with the second surface of the second prism.

Optionally, the optical device further comprises: a scanning arrangement configured to change an angle of incidence of light beams, emitted by the source of light, on the first surface of the first prism.

Optionally, the scanning arrangement includes a rotational mechanism configured to rotate at least the prism assembly about an axis of rotation, and the axis of rotation is parallel to at least one of: i) an edge of the first prism formed by the first surface of the first prism and the second surface of the first prism, or ii) an edge of the second prism formed by the first surface of the second prism and the second surface of the second prism.

Optionally, the axis of rotation passes through the beamsplitter configuration.

Optionally, the optical device further comprises a reflective coating applied to at least one of the surfaces of at least one of the first prism or the second prism.

Optionally, the plurality of surfaces of the second prism further includes a third surface, and light beams that propagate from the source of light to the detector along the first optical path are reflected once from each of the first and third surfaces of the second prism.

Optionally, at least some of the reflections of the light beams from the first and third surfaces of the second prism are reflections by total internal reflection.

Optionally, the second surface of the second prism is oblique to the third surface of the second prism.

Optionally, the plurality of surfaces of the first prism further includes a third surface, and light beams that propagate from the source of light to the detector along the second optical path are reflected once from each of the first and third surfaces of the first prism.

Optionally, at least some of the reflections of the light beams from the first and third surfaces of the first prism are reflections by total internal reflection.

Optionally, the second surface of the first prism is oblique to the third surface of the first prism.

Optionally, the plurality of surfaces of the first prism further includes a third surface, and the plurality of surfaces of the second prism further includes a third surface, and the light-transmitting material of the first and second prisms have a refractive index greater than a refractive index of a medium in which the prism assembly is deployed so as to define a critical angle such that light beams that propagate along the first and second optical paths that are incident on the first and third surfaces of the first and second prisms at angles greater than the critical angle are reflected from the first and third surfaces of the first and second prisms by total internal reflection.

Optionally, the first surface of the first prism is further associated with a second detector, and light beams emitted by the source of light propagate through the first and second prisms along a third optical path and a fourth optical path so as to reach the second detector as two coherent light beams, and light beams that propagate from the source of light to the second detector along the third optical path are reflected from the beamsplitter configuration exactly twice and are not transmitted by the beamsplitter configuration, and light beams that propagate from the source of light to the second detector along the fourth optical path are transmitted by the beamsplitter configuration exactly twice and are not reflected from the beamsplitter configuration.

Optionally, a difference between a length of the third and fourth optical paths varies as a function of an angle of incidence of the incoming light beam due at least in part to the length of the interface region.

Optionally, the optical device further comprises an anti-reflection coating applied to the first surface of the first prism and the first surface of the second prism.

Optionally, the beamsplitter configuration includes a beamsplitter coating applied to at least a portion of at least one of the second surface of the first prism or the second surface of the second prism.

Optionally, the beamsplitter configuration includes a thin piece of material optically attached to, and extending along at least a portion of, at least one of the second surface of the first prism or the second surface of the second prism.

Optionally, the beamsplitter configuration is wavelength and polarization independent.

Optionally, the first and second prisms are triangular prisms.

Optionally, the first and second prisms are right angle prisms.

Optionally, the first and second prisms are mutually geometrically similar.

Optionally, the first prism is a mirrored version of the second prism.

Optionally, the first prism is a scaled version of the second prism.

Optionally, the interface region extends along a majority portion of the second surface of the first prism and a majority portion of the second surface of the second prism, and the majority portions are substantially equally sized portions.

Optionally, the interface region extends along a majority portion of the second surface of the first prism and a majority portion of the second surface of the second prism, and the majority portions are unequally sized portions.

Optionally, the interface region extends along a majority portion of the second surface of the first or second prism, and the interface region extends along substantially the entirety of the second surface of the second or first prism.

There is also provided according to an embodiment of the teachings of the present invention an optical device. The optical device comprises: a prism assembly including: a first prism comprising a light-transmitting material having a plurality of surfaces including at least a first surface associated with a source of light and a second surface oblique to the first surface, and a second prism comprising a light-transmitting material having a plurality of surfaces including at least a first surface associated with a detector and a second surface oblique to the first surface of the second prism, the second surface of the first prism is in overlapping relation with the second surface of the second prism to define an interface region and such that at least one of a portion of the second surface of the first prism extends beyond the second surface of the second prism, or a portion of the second surface of the second prism extends beyond the second surface of the first prism, by a given offset amount, and the first and second prisms are optically attached at the interface region; and a beamsplitter configuration overlying the interface region, such that an incoming light beam emitted by the source of light propagates through the first and second prisms along a first optical path and a second optical path so as to reach the detector as two coherent light beams, and such that light beams that propagate from the source of light to the detector along each of the first and second optical paths are reflected from the beamsplitter configuration and transmitted by the beamsplitter configuration exactly once.

Optionally, a minority portion of the second surface of the first prism extends beyond the second surface of the second prism by a first given offset amount, and a minority portion of the second surface of the second prism extends beyond the second surface of the first prism by a second given offset amount.

Optionally, the first given offset amount is substantially equal to the second given offset amount.

Optionally, the first given offset amount is unequal to the second given offset amount.

Optionally, a minority portion of exactly one of the second surface of the first prism or the second surface of the second prism extends beyond the second surface of the second prism or the second surface of the first prism by a given offset amount.

There is also provided according to an embodiment of the teachings of the present invention a method of forming an interferogram. The method comprises:

deploying a prism assembly having a beamsplitter configuration in an optical path from a source of light to a detector, the prism assembly includes a first prism and a second prism, the first prism comprises a light-transmitting material having a plurality of surfaces including at least a first surface associated with the source of light and a second surface oblique to the first surface, and the second prism comprises a light-transmitting material having a plurality of surfaces including at least a first surface associated with the detector and a second surface oblique to the first surface of the second prism, and the second surface of the first prism is in overlapping relation with the second surface of the second prism to define an interface region of a given length that partially extends along at least one of the second surface of the first prism or the second surface of the second prism, and the beamsplitter configuration overlies the interface region and the first and second prisms are optically attached at the interface region; varying an angle of incidence of light beams, emitted by the source of light, to one of the surfaces of the prism assembly; and while varying the angle of incidence, detecting, by the detector, light beams emitted by the source of light, each light beam emitted by the source of light propagates through the first and second prisms along a first optical path and a second optical path so as to reach the detector as two coherent light beams, and each light beam that propagates from the source of light to the detector along each of the first and second optical paths is reflected from the beamsplitter configuration and transmitted by the beamsplitter configuration exactly once, and a difference between a length of the first and second optical paths varies as a function of the angle of incidence of each incoming light beam due at least in part to the length of the interface region.

Optionally, the method further comprises: deploying a second detector in association with the first surface of the first prism; and while varying the angle of incidence, detecting, by the second detector, light beams emitted by the source, each light beam emitted by the source of light propagates through the first and second prisms along a third optical path and a fourth optical path so as to reach the second detector as two coherent light beams, and each light beam that propagates from the source of light to the second detector along the third optical path is reflected from the beamsplitter configuration exactly twice and is not transmitted by the beamsplitter configuration, and each light beam that propagates from the source of light to the second detector along the fourth optical path is transmitted by the beamsplitter configuration exactly twice and is not reflected from the beamsplitter configuration.

Optionally, the varying the angle of incidence includes rotating at least the prism assembly about an axis of rotation.

Optionally, the axis of rotation passes through the beamsplitter configuration.

Optionally, the axis of rotation is parallel to at least one of: i) an edge of the first prism formed by the first surface of the first prism and the second surface of the first prism, or ii) an edge of the second prism formed by the first surface of the second prism and the second surface of the second prism.

There is also provided according to an embodiment of the teachings of the present invention an optical device. The optical device comprises: a first substantially planar reflective surface associated with a source of light; a second substantially planar reflective surface; a third substantially planar reflective surface associated with a detector; a fourth substantially planar reflective surface; and a substantially planar beamsplitter configuration, the planes of the first planar reflective surface, the second planar reflective surface, and the beamsplitter configuration intersect to form a first prismatic structure, and the planes of the third planar reflective surface, the fourth planar reflective surface, and the beamsplitter configuration intersect to form a second prismatic structure, and the plane of the beamsplitter configuration and the plane of the first reflective surface intersect to form a first line of intersection, and the plane of the beamsplitter configuration and the plane of the second reflective surface intersect to form a second line of intersection, and the plane of the beamsplitter configuration and the plane of the third reflective surface intersect to form a third line of intersection, and the plane of the beamsplitter configuration and the plane of the fourth reflective surface intersect to form a fourth line of intersection, and the first and second prismatic structures are in overlapping relation along the plane of the beamsplitter configuration such that at least one of a point on the fourth line of intersection extends beyond a colinear point on the second line of intersection, or a point on the first line of intersection extends beyond a colinear point on the third line of intersection by a given offset amount, and a light beam emitted by the source of light propagates to the detector along a first optical path and a second optical path so as to reach the detector as two coherent light beams, and light beams that propagate from the source of light to the detector along the first optical path are transmitted once by the beamsplitter configuration, and are reflected once by the beamsplitter configuration, the first reflective surface, and the second reflective surface, and light beams that propagate from the source of light to the detector along the second optical path are transmitted once by the beamsplitter configuration, and are reflected once by the beamsplitter configuration, the third reflective surface, and the fourth reflective surface.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 6 is a schematic plan view of the optical device of FIG. 3, modified to show a source of light and a detector, and to show the traversal of light rays, via the prisms and the beamsplitter, from the source of light to the detector along a first optical path;

FIG. 7 is a schematic plan view of the optical device of FIG. 3, modified to show a source of light and a detector, and to show the traversal of light rays, via the prisms and the beamsplitter, from the source of light to the detector along a second optical path;

FIG. 10 is a schematic plan view of the optical device of FIG. 3, modified to show a source of light and a second detector, and to show the traversal of light rays, via the prisms and the beamsplitter, from the source of light to the second detector along a third optical path;

FIG. 11 is a schematic plan view of the optical device of FIG. 3, modified to show a source of light and a second detector, and to show the traversal of light rays, via the prisms and the beamsplitter, from the source of light to the second detector along a fourth optical path;

FIG. 15 is a schematic plan view of an optical device having two prisms and a beamsplitter deployed therebetween, with one of the prisms being a scaled version of the other prism and the two prisms positioned one with respect to the other along an interface region, constructed and operative according to another embodiment of the present invention;

FIG. 16 is a schematic exploded plan view to show the details of the interface region between the prisms of FIG. 15;

FIG. 17 is a schematic plan view of an optical device having two prisms and a beamsplitter deployed therebetween, with one of the prisms being a scaled version of the other prism and the two prisms positioned one with respect to the other along an interface region, constructed and operative according to a further embodiment of the present invention;

DESCRIPTION OF THE PREFERRED EMBODIMENTS

Figure 1:
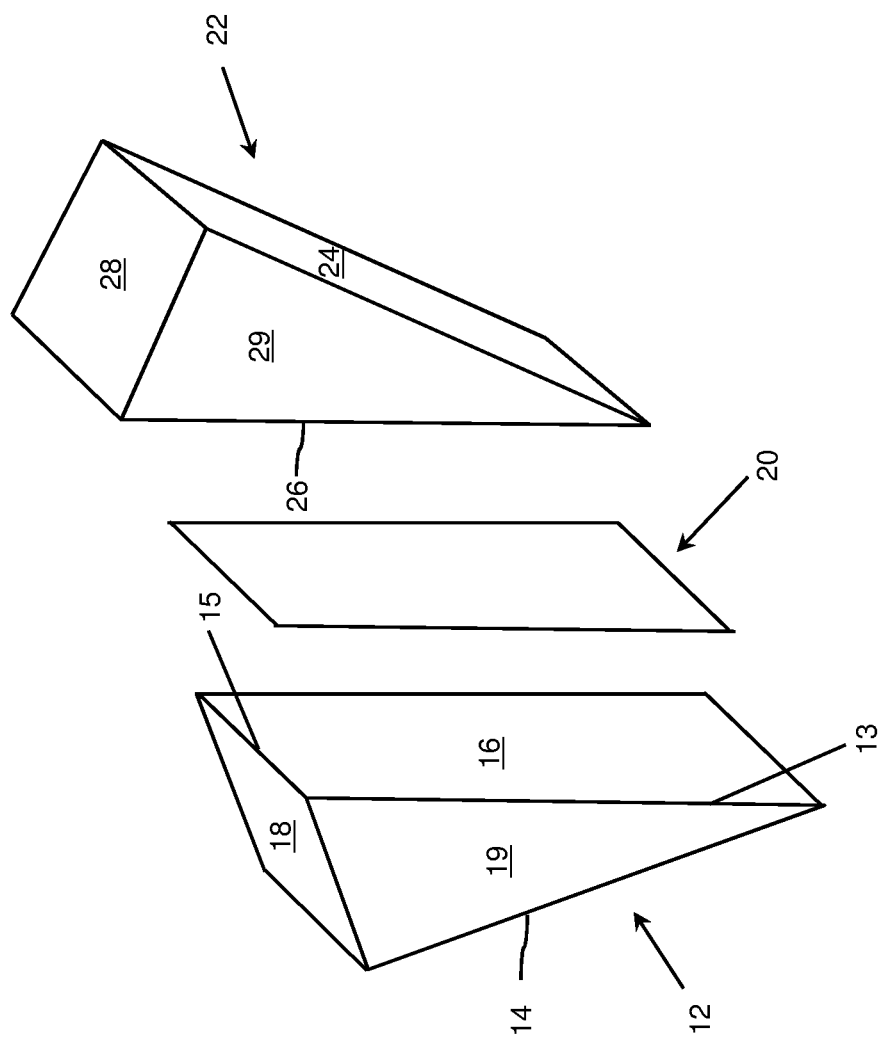
FIG. 1 is a schematic isometric view of an optical device having two prisms translated one with respect to the other and a beamsplitter deployed therebetween, constructed and operative according to an embodiment of the present invention.
Figure 2:
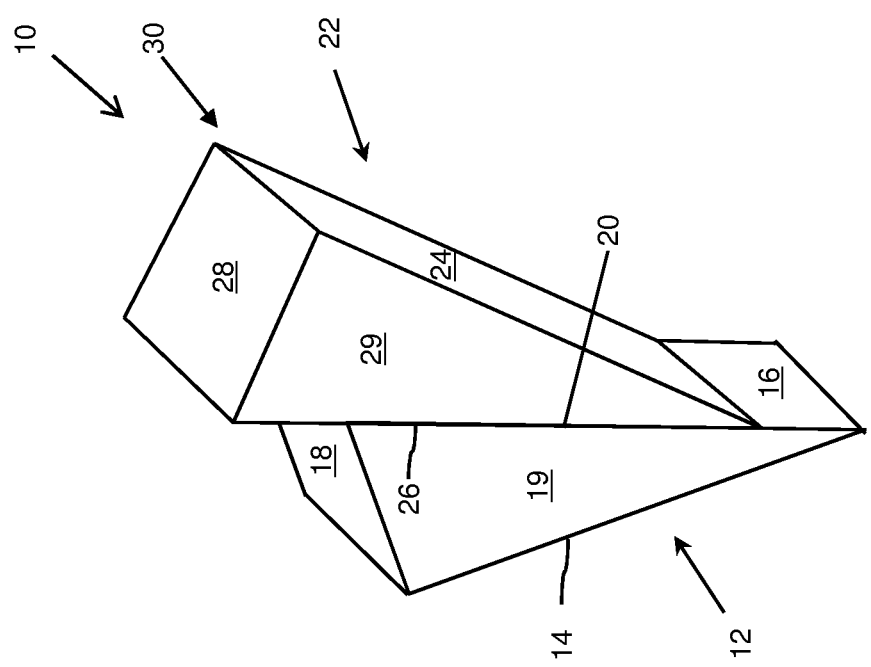
FIG. 2 is a schematic exploded isometric view to show the details of the prisms and the beamsplitter of the optical device of FIG. 1.
Figure 5:
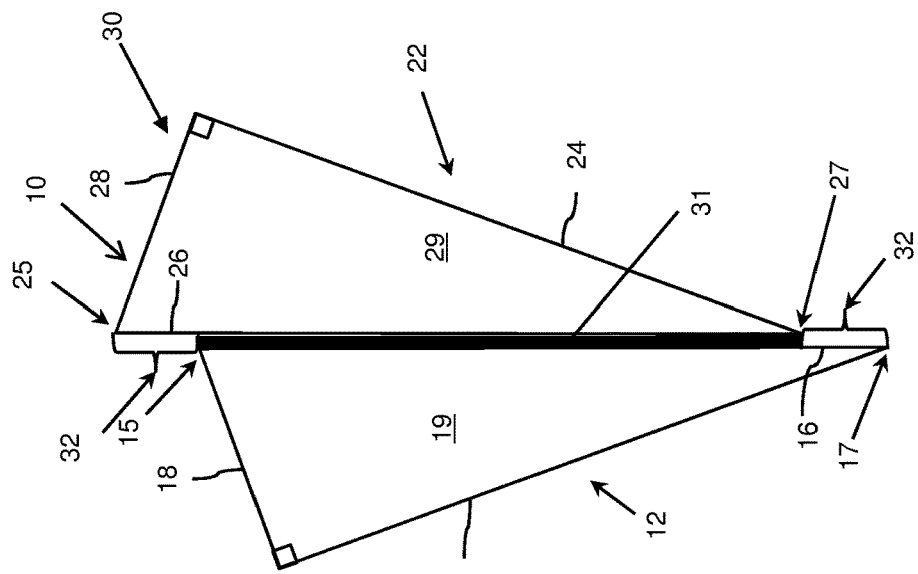
FIG. 5 is a schematic plan view showing the details of an interface region between the prisms of FIGS. 1 and 3.

Embodiments of the present invention provide interferometric optical devices and systems based on two geometrically similar prisms having a beamsplitter configuration deployed between the prisms. In certain embodiments, the interferometer has a general cross-sectional v-shape.

The principles and operation of the optical devices and systems according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, front and rear, upper and lower, top and bottom, and the like. These directional references are exemplary only to illustrate the invention and embodiments thereof.

Referring now to the drawings, FIGS. 1-8 illustrate various views of an optical device, generally designated 10, and corresponding components thereof, constructed and operative according to various aspects of the present disclosure. In general terms, the optical device 10 includes two triangular prisms, namely a first prism 12 and a second prism 22, each formed from a light-wave transmitting material, and a beamsplitter configuration 20 deployed between the first prism 12 and the second prism 22, to provide interferometric functionality. The interferometric functionality is enabled by prisms 12, 22 that are mutually geometrically similar such that the prisms 12, 22 would be perfectly symmetric about a plane of symmetry if not for scaling and/or translating of one of the prisms with respect to the other. Within the context of this document, two geometric objects (three-dimensional and made of planar surfaces) are considered to be geometrically similar if one can be obtained from the other by scaling (i.e., enlarging or reducing) one or more of the surfaces (either independently or uniformly) of one of the objects, possibly with one or more of additional translation, rotation and reflection, without changing the angles between the surfaces of each of the objects. As will become apparent, the geometric similarity of the two prisms 12, 22 provides particular advantages when scanning the optical path difference (OPD)—defined as the difference in length between two optical paths through the prisms 12, 22—by way of changing the angle of incidence of light rays (emitted by a source of light) measured with respect to the normal relative to the incident surface of one of the prisms 12 across a field of view of the optical device 10. For a given optical path through a medium, the optical path length is generally defined as the path integral of the geometric path length multiplied by the local index of refraction of the medium along the path.

Bearing the above in mind, the first prism 12 has a number of planar external surfaces, including the following three main surfaces: a first surface 14 associated with a source of light, a second surface 16, and a third surface 18. The first surface 14 serves a light-wave entrance for incoming light waves (schematically represented as light rays) from the source of light, as will subsequently be discussed in greater detail. The apex angle α is defined as the angle between the first surface 14 and the second surface 16, and is less than 90°.

In the present embodiment, the first prism 12 is a right-angled triangular prism, wherein the first surface 14 and the third surface 18 are joined at a right angle and the second surface 16 is oblique (and acute) to both the first surface 14 and the third surface 18. It is noted that the optical devices of the present disclosure are preferably based on right-angled (or approximately right-angled) triangular prisms. Right-angled prisms provide certain advantages over non-right-angled prism, for example, with respect to the manufacturing process of the prism assembly 30, as right-angle cuts are typically easier to fabricate than non-right-angled prisms when using conventional optical device manufacturing machinery. However, non-right-angled prisms, i.e., prisms having a largest internal angle not equal to 90° are also contemplated herein, and may have advantages in certain applications. Generally speaking, the mathematical relationships between the various prism parameters may vary slightly (as will be discussed in subsequent sections of the present disclosure), but the overall function of the optical set-up remains the same regardless of these parameters. Therefore, the optical devices according to the embodiments of the present disclosure should not be limited in scope to right-angled triangular prisms.

The first prism 12 also includes additional external surfaces, including a triangular shaped front surface 19 that is joined to the three surfaces 14, 16, 18, and a triangular shaped rear surface (not shown) parallel to, and opposite from, the front surface 19. In the present embodiment, the three surfaces 14, 16, 18 are rectangular surfaces, and in certain embodiments the third surface 18 is square shaped. In all embodiments, the surfaces 19 and 29 are coplanar (i.e., they lay in the same plane), and the rear surfaces opposite the surfaces 19 and 29 are coplanar. Parenthetically, since the surfaces 19, 29 and their opposing surfaces do not play a significant role in the interferometric process (other than that the prism thickness should be big enough to contain the optical beams propagating along their respective optical paths), this coplanarity is not critical and is not necessary for the invention. The surface 19 and its opposing surface are preferably parallel to each other and orthogonal to the surfaces 14 and 18, and the surface 29 and its opposing surface are preferably parallel to each other and orthogonal to the surfaces 24 and 28, however, this parallelism and orthogonality is not a strict requirement. In fact, the surfaces 19, 29 and their opposing surfaces may be non-planar surfaces.

The second prism 22 has a number of planar external surfaces, including the following three main surfaces: a first surface 24 associated with a detector, a second surface 26, and a third surface 28. The first surface 24 serves a lightwave exit surface for light waves to exit the second prism 22 to the detector, as will subsequently be discussed in greater detail. In the present embodiment, the second prism 22, like the first prism 12, is a right-angled triangular prism, wherein the first surface 24 and the third surface 28 are joined at a right angle and the second surface 26 is oblique to both the first surface 24 and the third surface 28.

In certain embodiments, the two prisms 12, 22 are of the same size and are mirror images of each other but are translated (i.e., shifted) one with respect to the other along the length of the second surfaces 16, 26. In such embodiments, the prisms 12, 22 would be perfectly symmetric about a plane of symmetry extending along second surfaces 16, 26 if not for the translation. In other embodiments, the second prism 22 is a scaled and mirror imaged version of the first prism 12 and the prisms 12, 22 may also be translated one with respect to the other along the second surfaces 16, 26. In such embodiments, the prisms 12, 22 would be perfectly symmetric about a plane of symmetry extending along second surfaces 16, 26 if not for the scaling and translation. In all of the aforementioned embodiments, since the two prisms 12, 22 are geometrically similar, the apex angle $\alpha$ is also the angle between the first surface 24 and the second surface 26.

The second prism 22 also includes additional external surfaces, including a triangular shaped front surface 29 that is joined to the three surfaces 24, 26, 28, and a triangular shaped rear surface (not shown) parallel to, and opposite from, the front surface 29. As should be understood by the property of geometric similarity, the three surfaces 24, 26, 28 are rectangular surfaces, and in certain embodiments the third surface 18 is square shaped.

Figure 4:
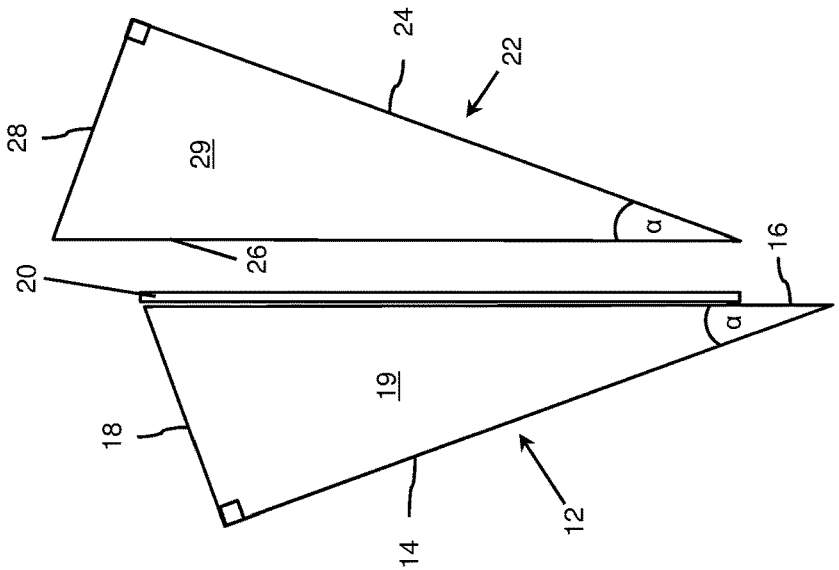
FIG. 4 is a schematic partially exploded plan view to show the details of the prisms and beamsplitter of the optical device of FIGS. 1 and 3.

At least one of the prisms 12, 22 is provided on the hypotenuse side (the second surface 16 or the second surface 26) with a coating to form a beamsplitter forming at least part of a beamsplitter configuration 20. In the non-limiting example illustrated in FIG. 4, the coating is provided on the hypotenuse side of the first prism 12 (i.e., on the second surface 16). Note that the thickness of the beamsplitter configuration 20 illustrated in FIG. 4 is exaggerated for clarity of illustration. Preferably, the beamsplitter configuration 20 is configured to transmit approximately half of the incoming light and reflect approximately half of the incoming light (ideally independently of angle of incidence and polarization). In certain embodiments, the hypotenuse sides of the two prisms 12, 22 are cemented to each other, to form a cemented prism assembly 30 having the beamsplitter configuration 20 fixedly deployed between the two hypotenuse sides (i.e., the surfaces 16, 26). In other embodiments, the hypotenuse sides are simply juxtaposed, or placed in good mechanical contact with each other, optionally by means of an additional transparent liquid or gel to improve optical contact between the prisms 12, 22 and to eliminate small detrimental air pockets in the interface region between the prisms 12, 22.

The coating can be provided on the hypotenuse side of at least one of the prisms 12, 22 in various ways. In one non-limiting example, the coating can be applied directly on a portion (preferably a majority portion) or the entirety of the hypotenuse side of one or both of the two constituent prisms 12, 22. In another non-limiting example, a thin piece of material, such as, for example, a sheet, foil, or thin glass plate, that has a beamsplitter coating deposited thereon and extends along a portion (preferably a majority portion) or the entirety of the hypotenuse sides of the two constituent prisms 12, 22, can be cemented between the hypotenuse sides of the two constituent prisms 12 to form the unitary prism assembly 30.

Parenthetically, the beamsplitter configuration 20 is preferably configured to reflect and transmit a proportion of light incident to the surface of the beamsplitter configuration independent of wavelength and polarization direction of the incident light. However, as will be discussed in subsequent sections of the present disclosure, the prisms 12, 22 may be constructed from materials which are transparent to light in particular regions of the electromagnetic spectrum, such as the visible (400 to 800 nanometer) range, the NIR, or the near infrared, usually referring to the 0.8 to 2.5 micron region, the medium wavelength infrared (MWIR) region, usually referring to the 3 to 5 micron range, and/or the long-wavelength infrared (LWIR) region, usually referring to the 7 to 14 micron region of the spectrum. Accordingly, light from the entire spectrum may not reach the beamsplitter configuration surface.

In all of the embodiments of the present disclosure, the second surfaces 16, 26 are in overlapping relation with each other (i.e., they mutually overlap) to define an interface region. The interface region is a two-dimensional region having a given width measured in the dimension of the edge 15 that joins together the surface 16 and the surface 18 (i.e., the direction into the plane of the paper), and a given length measured in the dimension of the edge 13 that joins together the surface 16 and the surface 19 (and equivalently the edge that joins together the surface 26 and the surface 29) which in the context of the drawings is the vertical dimension. The given length of the interface region extends partially along at least one of the second surfaces 16, 26. In certain preferred embodiments, the given length of the interface region extends along a majority of at least one of the second surfaces 16, 26. Within the context of this document, extending partially along a surface generally refers to extending along at least part of the surface but extending along less than the entirety of the surface. The interface region 31 is the region at which the two prisms 12, 22 are cemented together (or juxtaposed or placed in mechanical contact with each other) to form the unitary prism assembly 30, and may also be referred to as a contact surface or interface plane between the two prisms 12, 22. The beamsplitter configuration 20 overlies the entirety of the interface region 31, and is generally aligned with the interface region along the width dimension.

As will be discussed, in certain embodiments (e.g., FIGS. 1-11) the interface region extends partially along equal portions (equal majority portions in the illustrated example) of the second surfaces 16, 26, while in other embodiments (e.g., FIGS. 12-14) the interface region extends partially along unequal portions (unequal majority portions in the illustrated example) majority portions of the second surfaces 16, 26, and yet in other embodiments (e.g., FIGS. 15-17) the interface region extends along a majority portion of one of the second surfaces 16, 26 and extends along the entirety of the other of the second surfaces 16, 26.

Analogously, the second surfaces 16, 26 mutually overlap such that a portion of at least one of the surfaces 16, 26 extends beyond the other of the surfaces 16, 26 by a given offset amount along the dimension of the edge that joins together the surface 16 and the surface 19 (and equivalently the edge that joins together the surface 26 and the surface 29). In certain preferred embodiments, a minority portion of at least one of the surfaces 16, 26 extends beyond the other of the surfaces 16, 26. As will be discussed, in certain embodiments (e.g., FIGS. 1-14) the second surfaces 16, 26 mutually overlap such that a portion (a minority portion in the illustrated example) of the surface 16 extends beyond the surface 26 by a first given offset amount and a portion (a minority portion in the illustrated example) of the surface 26 extends beyond the surface 16 by a second given offset amount. In some embodiments (e.g., FIGS. 1-11), the first and second given offset amounts are equal, i.e., the amount by which the surface 16 extends beyond the surface 26 is the same as the amount by which the surface 26 extends beyond the surface 16. In other embodiments (e.g., FIGS. 12-14), the first and second given offset amounts are unequal, i.e., the amount by which the surface 16 extends beyond the surface 26 is less than or greater than the amount by which the surface 26 extends beyond the surface 16. In yet other embodiments (e.g., FIGS. 15-17), the second surfaces 16, 26 mutually overlap such that a minority portion of only one of the surfaces 16, 26 extends beyond the other of the surfaces 16, 26 by a given offset amount, i.e., the surface 16 extends beyond the surface 26 by a given offset amount but the surface 26 does not extend beyond the surface 16, or the surface 26 extends beyond the surface 16 by a given offset amount but the surface 16 does not extend beyond the surface 26. It is noted that in the accompanying drawings, the size of the offset amount(s) is/are exaggerated for clarity of illustrating the operation of the optical devices of the present disclosure.

By further analogy, the second surfaces 16, 26 mutually overlap such that at least one of the edges of one of the prisms 12, 22 extends beyond a corresponding one of the edges of the other prism by a given offset amount along the dimension of the edge that joins together the surface 16 and the surface 19 (and equivalently the edge that joins together the surface 26 and the surface 29).

Within the context of this document, the majority portion of a surface generally refers to the contiguous portion of the surface that covers at least half (50%) of the length of the surface but not the entire length of the surface. Similarly, within the context of this document, the minority portion of a surface generally refers to the contiguous portion of the surface that covers at least some, but less than half (50%), of the length of the surface.

Looking at the optical device 10 of FIGS. 1-8, the second surfaces 16, 26 mutually overlap to define an interface region 31 of a given length that extends along equal portions (equal majority portions in the illustrated example) of the second surfaces 16, 26. The amount of overlap between the second surfaces 16, 26 effects a translation (i.e., shift) of one of the prisms with respect to the other along the second surfaces 16, 26 by a given offset amount 32 (also referred to interchangeably herein as a shift amount or translation amount). Without loss of generality, the offset amount 32 is the amount by which one of the surfaces 16, 26 extends beyond the other of the surfaces 16, 26 along the dimension of the edge 13 that joins together the surface 16 and the surface 19 (and equivalently the edge that joins together the surface 26 and the surface 29). The offset amount 32 can be equivalently defined as the distance between a point on the edge 15 of the first prism 12 and a point on the edge 25 of the second prism 22, where the edge 15 joins together the surface 16 and the surface 18, and the edge 25 joins together the surface 26 and the surface 28. The points on the edges 15, 25 between which the offset amount 32 is measured are coplanar. Analogously, the offset amount 32 can be defined as the distance (along the dimension of the edge that joins together the surface 16 and the surface 19) by which the edge 25 or 15 extends beyond the edge 15 or 25.

In the present embodiment in which the two prisms 12, 22 are of the same size and are mirror images of each other that are translated along the length of the surfaces 16, 26, the surface 16 extends beyond the surface 26 (at the top of the prism assembly 30) and the surface 26 extends beyond the surface 16 (at the bottom of the prism assembly 30) by the same offset amount 32. Accordingly, the offset amount 32 can equally be defined as the distance between a point on the edge 27 of the second prism 22 and a point on the edge 17 of the second prism 12, where the edge 17 joins together the surface 14 and the surface 16, and the edge 27 joins together the surface 24 and the surface 26. The points on the edges 17, 27 between which the offset amount 32 is measured are coplanar. Analogously, the offset amount 32 can be defined as the distance (along the dimension of the edge that joins together the surface 16 and the surface 19) by which the edge 17 or 27 extends beyond the edge 27 or 17. Parenthetically, the offset amount 32 is complementary to the length of the interface region 31 (it is the difference between the length of edge 13 and the length of the interface region along the surfaces 16 and 26). In other words, an interface region 31 of large length corresponds to a small relative shift between the two prisms 12, 22 (i.e., a small offset amount 32), whereas an interface region 31 of small length corresponds to a large relative shift between the two prisms 12, 22 (i.e., a large offset amount 32).

The prisms 12, 22 are preferably constructed from a light-wave transmitting material, suitable for the desired application of the optical device 10, and having a refractive index that is high enough such that light waves propagating within the prisms 12, 22 at angles greater than a critical angle (measured relative to the normal to the incident surface and defined by the refractive index of the prisms 12, 22 and the refractive index of the medium in which the prism assembly 30 is deployed, e.g., air), are trapped within the prisms 12, 22 by total internal reflection from the first and third surfaces 14, 18, 24, 28. As will be discussed in subsequent sections of the present disclosure, in particular with reference to FIGS. 6-8, the specific design choice of the internal angles of the prisms 12, 22 and the material from which the prisms 12, 22 are constructed play an essential role in determining the propagation path of light through each of the prisms 12, 22.

The surfaces 14, 18, 24, 28 may alternatively be coated with a specularly reflective (for example metal such as aluminum or gold, or other approximately wavelength independent reflectors) coating in order to achieve high reflection of light rays. Angularly selective reflective (ASR) coatings are also contemplated herein, so that the light propagates within desired angular ranges. Note that one of the prisms 12, 22 may be constructed from the high index material and the other of the prisms 12, 22 may be coated with a specularly reflective or an ASR coating.

Figure 8:
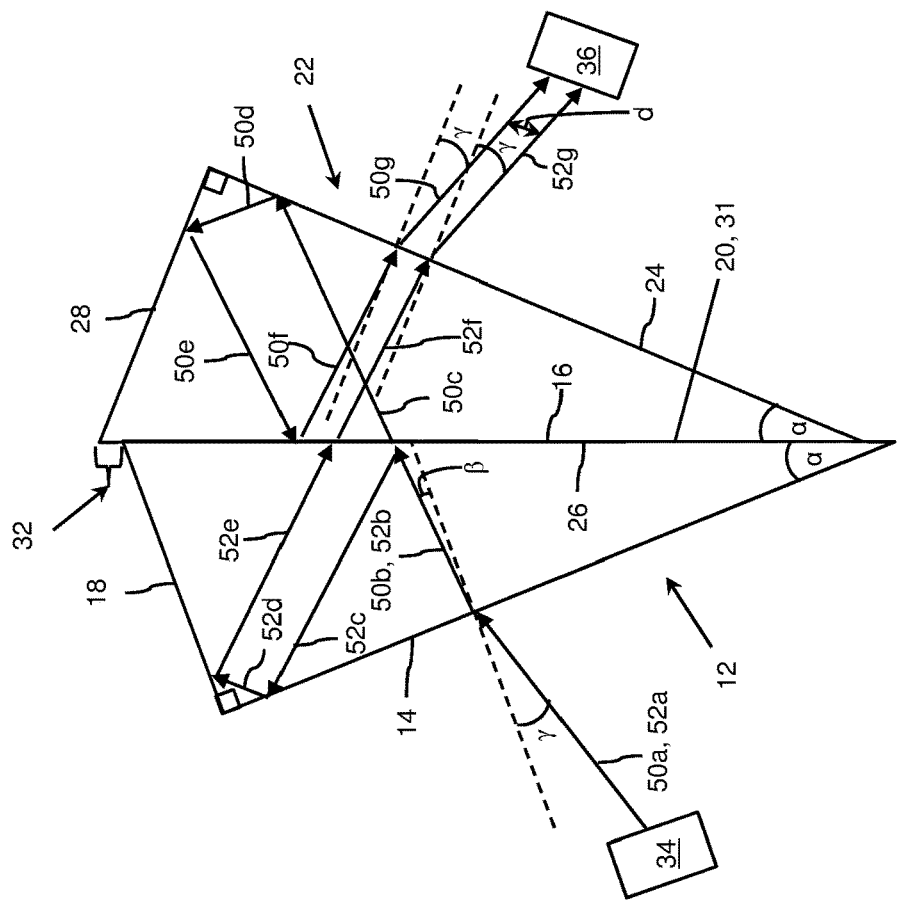
FIG. 8 shows the traversal of the light rays illustrated in FIGS. 6 and 7 overlaid in a single drawing.

With particular reference to FIGS. 6-8, there is shown the traversal of light rays through the prism assembly 30 when the prism assembly 30 is deployed in an optical path between a source of light 34 and a detector arrangement 36 (referred to hereinafter as detector 36). The source of light 34 emits light beams, where each beam can be considered a generally planar wavefront that enters the prism assembly 30 from different directions through one of the surfaces of the prism assembly 30, which by way of illustration is the first surface 14 of the first prism 12. A single beam of light emitted by the source of light 34 propagates through the prism assembly 30 along two different optical paths resulting in two coherent beams at the output of the prism assembly 30 that impinge on the detector 36. The coherent beams that reach the detector 36 are used to build up an interferogram by way of scanning of the optical path difference (via, for example, rotation of the prism assembly 30 and/or changing entrance direction of the beam emitted by the source of light 34).

Parenthetically, the source of light 34 can be a manufactured source or a natural scene, depending on the application of the optical device 10. In a particularly useful application, the optical device 10 is used for spectral imaging of a remote scene, where the radiation from every scene pixel can be imaged simultaneously by a multi-element detector. In other applications, the manufactured source is a wide band or monochromatic source, used to illuminate a sample, in order to analyze the spectral characteristics of the sample. In even further applications the source itself is the object of the spectral analysis, rendered possible by the present invention. In the above-mentioned remote scene spectral imaging example, the spectral information for every pixel is obtained simultaneously by acquiring the signals through rotation or translation of the prism and the multi-element detector 36, or by other scanning means known by the person skilled in the art. In other examples the detector is made of a single element and the information is gathered as function of time by scanning the entrance angle of the source radiation with respect to the first surface 14 of the prism 12. A spectral region of notable relevance for the purpose of the present invention is the infrared region, particularly the MWIR and the LWIR regions of the electromagnetic spectrum. In such applications, the prisms 12, 22 are constructed from a material that is transparent to light having wavelengths in the above regions (3-5 µm or 8-15 µm, respectively), for example zinc selenide (ZnSe), which has an almost wavelength-independent refractive index of approximately 2.4 in the above region. When the prism assembly 30 is deployed in air, the resultant critical angle for light in this wavelength region is approximately 24.6°. Constructing the prisms 12, 22 from other materials, such as germanium dioxide, which has a refractive index of approximately 1.65, is also contemplated. In such a construction, when the prism assembly 30 is deployed in air, the resultant critical angle is approximately 37.3°.

In the other potential applications mentioned above, the optical device 10 may be used to determine the spectral characteristics of an illumination arrangement composed of, for example, one or more LEDs or other types of light sources, the incoming light waves to the prism assembly 30 are received directly from the illumination arrangement. In such applications the source of light 34 is the illumination arrangement itself. In other applications, the optical device 10 may be used to determine the spectral characteristics of an object that emits (via, for example, diffusion or reflection) light waves in response to illumination by an illumination arrangement. In such applications, the object to be analyzed is the light waves emitting object, and the source of light 34 is deployed in such a way so as to illuminate the light waves emitting object.

Although not shown in the drawings, a lens (or lenses) may be deployed in the optical path between the source of light 34 and the surface 14 so as to gather or direct the light from the source of the light 34 toward the surface 14. Another lens (or lenses) may be deployed in the optical path between the surface 24 and the detector 36 so as to focus the light exiting the second prism 22 onto the plane of the detector 36.

Referring first to FIG. 6, there is shown the traversal of a beam from the source of light 34 to the detector 36 along a first optical path (having a corresponding first optical path length) through the prism assembly 30. The light beam, represented schematically in FIG. 6 as a sample light ray 50a, is incident to the first surface 14 at an incident angle of γ (where the incident angle is measured relative to the normal to the surfaced 14, shown by the dotted line crossing the surface 14). It is noted that the light ray 50a is one of multiple rays that span the beam. It is further noted that the beam may be one of many beams that is incident on the first surface 14, where each beam is spanned by multiple light rays that may or may not be parallel to the light rays of other beams.

The incident light ray 50a is transmitted by the first surface 14. The transmitted light ray is designated as 50b. When the incident light ray 50a is incident to the surface 14 at an oblique angle, the light ray 50a is refracted upon entering the prism 12 such that the refracted transmitted light ray 50b propagates at an angle of ft (relative to the normal to the surface 14). In order to minimize intensity loss during transmission of the light ray 50a through the first surface 14, the first surface 14 is preferably coated with an anti-reflective coating. The transmitted light ray 50b impinges on the beamsplitter configuration 20 where a proportion of the intensity of the light ray 50b is transmitted by the beamsplitter configuration 20, and is designated as light ray 50c. Preferably the proportion of the transmitted intensity is approximately 50% of the intensity. The transmitted light ray 50c impinges on the first surface 24 of the second prism 22 at an angle greater than the critical angle such that it is totally internally reflected as light ray 50d. The light ray 50d propagates toward the third surface 28 and impinges on the third surface 28 at an angle greater than the critical angle such that it is totally internally reflected as light ray 50e.

Parenthetically, it is noted that in alternative embodiments in which the surfaces 24, 28 are coated with an ASR coating, the reflections of the light rays 50c and 50d at the respective surfaces 28 and 24 are due to the specularly reflecting or ASR coating and not total internal reflection. It is further noted that if the source of light 34 is positioned such that the light ray 50b impinges on the beamsplitter configuration 20 at a region closer to the upper portion of the interface region 31 (i.e., far from the apex of the prisms 12, 22), the order of reflection at the surfaces 24, 28 may be reversed. Specifically, the transmitted light ray 50c may be reflected (by total internal reflection or the ASR coating) at the third surface 28 to produce the light ray 50d, whereupon the light ray 50d is reflected at the first surface 24 (by total internal reflection or the specularly reflecting or the ASR coating) to produce the light ray 50e.

The light ray 50e propagates toward the beamsplitter configuration 20 where a proportion of the intensity of the light ray 50e is reflected by the beamsplitter configuration 20, and is designated as light ray 50f. In the preferred embodiment in which the beamsplitter configuration 20 transmits approximately 50% of the intensity of incident light, the beamsplitter configuration 20 also reflects approximately 50% of the intensity of incident light.

The light ray 50f exits the second prism 22 via transmission by the first surface 24 of the second prism 22. The transmitted light ray is designated as 50g. When the light ray 50f is incident to the surface 24 at an oblique angle, the light ray 50f is refracted upon exiting the prism 22 such that the light ray 50g propagates at an angle of γ (relative to the normal to the surface 24), whereupon the light ray 50g reaches the detector 36. It is noted that in situations in which the prisms 12, 22 are not right-angled prisms, but are still geometrically similar prisms, the above description of light propagation along the first optical path with respect to right-angled prisms holds except that the angle at which the beam exits through the surface 24 is γ', this angle being different from the incident angle γ.

As can be seen from FIG. 6, the light that propagates from the source of light 34 to the detector 36 along the first optical path undergoes exactly one reflection and one transmission by the beamsplitter configuration 20.

FIG. 7 shows the traversal of the same beam emitted by the source of light 34 in FIG. 6 to the detector 36 along a second optical path (having a corresponding second optical path length different from the first optical path length) through the prism assembly 30. The second optical path follows the trajectory of the light that corresponds to the proportion of the light ray 50b that is reflected by the beamsplitter configuration 20. The light beam, represented schematically in FIG. 7 as a sample light ray 52a (which in this case is the same as the light ray 50a), is transmitted by the first surface 14, and is designated as light ray 52b (which is the same as the light ray 50b). The transmitted light ray 52b impinges on the beamsplitter configuration 20 where a proportion of the intensity of the light ray 52b is reflected by the beamsplitter configuration 20, and is designated as light ray 52c.

The light ray 52c impinges on the first surface 14 of the first prism 12 at an angle greater than the critical angle such that it is totally internally reflected as light ray 52d. The light ray 52d propagates toward the third surface 18 and impinges on the third surface 18 at an angle greater than the critical angle such that it is totally internally reflected as light ray 52e.

Parenthetically, it is noted that in alternative embodiments in which the surfaces 14, 18 are coated with a specularly reflecting or an ASR coating, the reflections of the light rays 52c and 52d at the respective surfaces 18 and 14 are due to the specularly reflecting or ASR coating and not total internal reflection. It is further noted that if the source of light 34 is positioned such that the light ray 52b impinges on the beamsplitter configuration 20 at a region closer to the upper portion of the interface region 31 (i.e., far from the apex of the prisms 12, 22), the order of reflection at the surfaces 24, 28 may be reversed. Specifically, the transmitted light ray 52c may be reflected (by total internal reflection or the ASR coating) at the third surface 18 to produce the light ray 52d, whereupon the light ray 52d is reflected at the first surface 14 (by total internal reflection or the ASR coating) to produce the light ray 52e.

The light ray 52e propagates toward the beamsplitter configuration 20 where a proportion of the intensity of the light ray 52e is transmitted by the beamsplitter configuration 20, and is designated as light ray 52f. The light ray 52f exits the second prism 22 via transmission by the first surface 24 of the second prism 22. The transmitted light ray is designated as 52g. When the light ray 52f is incident to the surface 24 at an oblique angle, the light ray 52f is refracted upon exiting the prism 22 such that the light ray 52g propagates at an angle of γ (relative to the normal to the surface 24), whereupon the light ray 52g reaches the detector 36. Similarly, it is noted that in situations in which the prisms 12, 22 are not right-angled prisms, but are still geometrically similar prisms, the above description of light propagation along the second optical path with respect to right-angled prisms holds except that the angle at which the beam exits through the surface 24 is γ', different from the incident angle γ.

As can be seen from FIG. 7, the light that propagates from the source of light 34 to the detector 36 along the second optical path undergoes exactly one reflection and one transmission by the beamsplitter configuration 20.

As is known to those of skill in the art, a relationship exists between the angle of incidence of the incoming light rays to the various surfaces of the prisms 12, 22 and the internal angles of the prisms 12, 22. For example, for an incoming light ray that is incident on the first surface 14 at an arbitrary oblique incident angle of $\theta_1$ (measured relative to the normal to the first surface 14), the transmitted light ray (e.g., the light ray 52b) is refracted so as to propagate at an angle of:

$$\theta_2 = \sin^{-1}\left(\frac{\eta_1 * \sin\theta_1}{\eta_2}\right)$$

where $\eta_2$ is the refractive index of the material of the prism 12, and $\eta_1$ is the refractive index of the medium in which the prism assembly 30 is deployed ($\eta_1$ is approximately 1 when the prism assembly 30 is deployed in air).

The angle $\theta_2$ at which the light ray 52b propagates is likewise measured relative to the normal to the first surface 14. The angle of incidence $\theta_3$ of the light ray 52b, measured relative to the normal to the surface of the beamsplitter configuration 20 (which is equivalently the second surface 16), is given by:

$$\theta_3 = 90 - \delta + \theta_2 = 90 - \delta + \sin^{-1}\left(\frac{\eta_1 * \sin\theta_1}{\eta_2}\right)$$

where δ is the angle between the second surface 16 and the third surface 18. Note for non-right-angled prisms, the value of 90 in the preceding equation is replaced by the corresponding maximum internal angle of the prisms (i.e., the angle between the first surface 14 and the third surface 18).

The angles of incidence (measured relative to the incident surface of the relevant prism 12, 22) of the remaining light rays in the propagating (i.e., optical) path to the detector 36 through the prism assembly 30 can be similarly computed using geometry, as is known to those skilled in the art.

FIG. 8 shows the propagation of the light rays 50a-50g and 52a-52g depicted in FIGS. 6 and 7 overlaid in a single figure. As can be seen in FIG. 8, by propagating through the prism assembly 30 along the two different optical paths, a pair of interfering coherent output beams is generated from the single incident beam (light ray 50a/52a). The pair of interfering coherent output beams reach the detector 36 and are used to build up an interferogram by way of scanning of the optical path difference (as will be discussed with reference to FIG. 9). The output beams are separated by a distance, designated d in FIG. 8, which is referred to as "lateral shear", and is measured along a direction parallel to the edge joining surfaces 24 and 29. The pair of interfering coherent beams is schematically represented by the parallel light rays 50g and 52g, which are spaced apart by the distance d.

Parenthetically, when the prisms 12, 22 are right-angled prisms, the angle at which light rays enter the first prism 12 (via the surface 14) is the same as the angle at which the light rays exit the second prism 22 (via the surface 24). However, as noted above, the entry and exit angles of light rays may not be identical in the case where the prisms 12, 22 are non-right-angled prisms. Nevertheless, the two coherent beams still exit the prism assembly 30 along a parallel trajectory (i.e., the light rays are spaced apart parallel rays) as long as the prisms are geometrically similar, which means that the angle γ' of exit of the two coherent beam is the same.

The sets of coherent beams at the output of the prism assembly 30 represent the various monochromatic components of the incident beam. As should be apparent, the results can be extrapolated for each light ray spanning a beam, and further extrapolated for other beams spanned by light rays which may be parallel or non-parallel to the light rays of other beams.

At the output of the prism assembly 30, the various monochromatic components of an incident beam interfere according to phase differences. These monochromatic components are recombined at the detector 36, where each component contributes a different amount to the total signal output by the detector 36. In general, the contribution is maximum if the phase difference (at a given wavelength) between the components is an even integer multiple of $\pi$, and the contribution is minimum if the phase difference between the components is an odd integer of $\pi$. The signals output by the detector 36 can be stored as a function of the optical path difference (OPD) between various monochromatic components. In the context of the embodiments of the present disclosure, the OPD is generally defined as the difference between the first and second optical path lengths. Using the example illustrated in FIGS. 6-8, the detector 36 output is stored as a function of the difference in the optical path traversed by the light rays 50a-50g and the light rays 52a-52g. The OPD is typically scanned in order to build up an interferogram, and spectral analysis (e.g., Fourier Analysis via Fourier Transform) can be applied to the interferogram to the determine the spectral characteristics of the source of light 34 as a function of wavenumber (inverse of wavelength).

The OPD is preferably scanned so as to cover a range of corresponding angles of incidence of light on the interferometer (optical device 10) such that the OPD varies as a function of the incident angle. The variability of the OPD as a function of incident angle is made possible by the non-symmetry of the two prism 12, 22, which in the present embodiment is effectuated by the presence of the offset amount 32. Therefore, it is critical to note that if no offset amount 32 were present, i.e., if the prism assembly was instead formed from two identical and symmetrically positioned prisms, the OPD would remain constant and equal to zero during scanning (i.e., adjustment of the incident angle) and therefore would not vary as a function of the incident angle (measured between the light rays emitted by the source of light 34 and the incident surface of the prism assembly). In other words, in order for the OPD to vary as a function of the incident angle in ways that are useful for the purposes of the present invention, the prisms 12, 22 should be mutually geometrically similar and should otherwise be symmetric about a plane of symmetry, except for the scaling and/or translating of one of the prisms with respect to the other of the prisms in the ways described in the present document.

Figure 9:
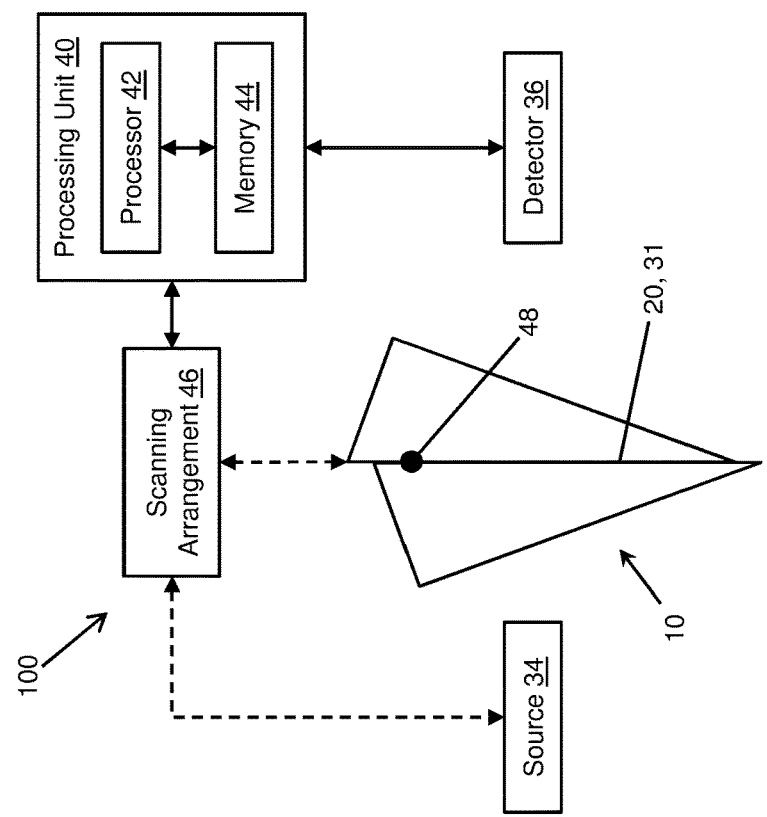
FIG. 9 is a schematic plan view of an optical system including the optical device of FIGS. 6-8, a scanning arrangement, and a processing unit, according to an embodiment of the present invention.

The scanning of the OPD can be effectuated by using a scanning arrangement which adjusts the angle of incidence of incoming light rays from the source of light 34 relative to the incidence surface of the prism assembly 30, and the buildup of the interferogram and spectral analysis may be performed by a processing system. FIG. 9 illustrates the optical device 10 corresponding to the structure detailed with respect to FIGS. 6-8, combined with a scanning arrangement 46 and a processing unit 40, linked to the scanning arrangement 46 and the detector 36, to form an expanded optical device (referred to also as an optical system 100). The scanning arrangement 46 can be implemented in various ways, including, for example, as a rotation and/or translation mechanism that translates either the source of light 34, or more preferably, rotates the prism assembly 30, about an axis of rotation that is parallel to the edges 15, 17, 25, 27, i.e., normal to the surfaces 19, 29 (normal to the plane of the paper), or jointly translates the prism assembly 30 together with the detector 36 relative to the source of light 34. In such implementations, the rotation/translation mechanism preferably includes an electro-mechanical drive arrangement, such as a motor/actuator mechanically linked to the prism assembly 30 or the source of light 34 via a rotatable rod to effectuate controlled rotation. When implemented as a rotational mechanism that rotates the prism assembly 30, the axis of rotation preferably passes through the beamsplitter configuration 20 near the region of the beamsplitter where the beams intersect the beamsplitter configuration 20 (the region is near the top if the beams enter near the top of the prism assembly 30, but is lower if the beams enter through the lower section of the prism assembly 30). This point is generally designated 48 in FIG. 9.

The scanning arrangement 46 may alternatively be implemented as a scanning mirror that deflects light rays from the source of light 34 towards the prism assembly 30 over a range of prescribed incident angles.

Note that the construction of the optical device 10, in particular the construction of the prism assembly 30, provides some advantage over other interferometer constructions. For example, the stability of the prism assembly 30 due to the solid construction from constituent prisms 12, 22 that are optically cemented together (or mechanically joined together), ensures that during movement of the prism assembly 30 or during deployment of the optical device (for example as part of a platform mounted spectral imager), all of the subcomponents of the prism assembly 30 move in unison, without any relative movement between the subcomponents.

As the OPD is scanned by the scanning arrangement 46, the processing unit 40 stores the signals output by the detector 36 as a function of the optical path difference (OPD) traversed by the coherent beams in a storage medium, such as a memory 44 of the processing unit 40, to build up an interferogram. A processor 42 of the processing unit 40 that is linked to the memory 44 applies spectral analysis algorithms, such as the Fourier Transform, to the interferogram to the determine the spectral characteristics of the source of light 34 as a function of wavenumber (inverse of wavelength). It is noted that the processing unit 40 may include multiple processors 42 and storage media. The processor 42 can be implemented as any number of computer processors including, but not limited to, a microprocessor, a microcontroller, an ASIC, and a DSP. Such processors include, or may be in communication with computer readable media, which stores program code or instruction sets that, when executed by the processor, cause the processor to perform actions. Types of computer readable media include, but are not limited to, electronic, optical, magnetic, or other storage or transmission devices capable of providing a processor with computer readable instructions. As should be apparent, all of the components of the processing unit 40 are connected or linked to each other (electronically) either directly or indirectly.

The processing unit 40 preferably provides control functionality for controlling the scanning arrangement 46 to operate in synchrony with the detector 36. Generally speaking, the processor 42 can be configured to provide control signals to the scanning arrangement 46 to actuate the scanning arrangement 46 to adjust the angle of incidence (e.g., via rotation of the prism assembly 30 or the source of light 34). In other embodiments, a dedicated electronic control unit, separate from, but linked to, the processing unit 40, may be used to provide the control functionality. In yet other embodiments, the processing unit 40 may include an additional dedicated processor, separate from the processor 42, configured to provide control signals to the scanning arrangement 46.

Referring again to FIGS. 6-8, it is noted that each of the coherent beams generated inside the interferometer undergoes a single reflection and a single transmission at the beamsplitter configuration 20. This ensures that interfering rays reach the detector 36 with a high intensity modulation between in-phase and out-of-phase components, by compensating for variability in the transmission and reflection coefficients of the beamsplitter configuration 20 and enables retaining of a maximum amount of spectral information in the signal. The following paragraphs provide a general analysis of the intensity modulation for the light rays (representative of the beams) that traverse the prism assembly 30 according to the illustrative example in FIGS. 6-8.

The amplitude $A_1$ of the emerging wavefront corresponding to the light ray 50g can generally expressed as:

$$A_1 = r * t * A$$

where r is the reflection coefficient for the amplitude of the electric field of a plane wave at the surface of the beamsplitter configuration 20, t is the transmission coefficient for the amplitude of the electric field of a plane wave at the surface of the beamsplitter configuration 20, and A is the amplitude of the wavefront incident to the beamsplitter configuration 20 (i.e., the wavefront corresponding to the light ray 50b).

Assuming that the angles of incidence to the surface of the beamsplitter configuration 20 in reflection and transmission are the same for the incident light ray 50b and the incident light ray 52b, the amplitude $A_2$ of the emerging wavefront corresponding to the light ray 52g can generally expressed as:

$$A_2 = r * t * A.$$

As should be apparent from the above, $A_1 = A_2$. When these two wavefronts are in-phase, the resulting light intensity on the detector 36 is maximum, and can be expressed as:

$$I_{max} = (A_1 + A_2)^2 = (2 * r * t * A)^2 = 4 * r^2 * t^2 * A^2.$$

When these two wavefronts are out-of-phase, the resulting light intensity on the detector 36 is minimum, and can be expressed as:

$$I_{min} = (A_1 - A_2)^2 = 0.$$

The intensity modulation M of an interferogram is expressed as:

$$M = 2 * \frac{I_{max} - I_{min}}{I_{max} + I_{min}}$$

which by substituting the above expressions for $I_{max}$ and $I_{min}$ yield M=2.

As may be apparent from FIGS. 6-8, a proportion of the intensity of the light ray 50e is also transmitted by the beamsplitter configuration 20 toward the first surface 14. Similarly, a proportion of the intensity of the light ray 52e is reflected by the beamsplitter configuration 20 toward the first surface 14 along a colinear trajectory to the transmitted ray. By deploying an additional detector in association with the first surface 14, approximately half of the light intensity lost by transmission of the light ray 50e and reflection of the light ray 52e can be gathered as interfering light rays by the additional detector and provided to the processing unit 40 to generate an interferogram from these so-called "lost rays", which are out-of-phase with the corresponding light rays 50e and 52e. The additional interferogram may be averaged, by the processing unit 40, with the interferogram corresponding to the light rays 50e and 52e to improve the overall spectral results.

FIGS. 10 and 11 show the traversal of light rays from the source of light 34 to a second detector 38 along respective third and fourth optical paths (having respective third and fourth optical path lengths).

Looking first at FIG. 10, the light ray 50a follows the same portion of the first optical path (FIG. 6) up to when the light ray 50e reaches the beamsplitter configuration 20. In contrast to the optical path illustrated in FIG. 6, in the present figure a proportion of the intensity of the light ray 50e is transmitted by the beamsplitter configuration 20, and is designated as light ray 50h. The light ray 50h exits the first prism 12 via transmission by the first surface 14, and is designated as light ray 50i, whereupon the light ray 50i reaches the second detector 38 that is associated with the first surface 14. When the light ray 50h is incident to the surface 14 at an oblique angle, the light ray 50h is refracted upon exiting the prism 12 such that the light ray 50i propagates at an angle of γ (relative to the normal to the surface 14).

Referring now to FIG. 11, the light ray 52a follows the same portion of the second optical path (FIG. 7) up to when the light ray 52e reaches the beamsplitter configuration 20. In contrast to the optical path illustrated in FIG. 7, in the present figure a proportion of the intensity of the light ray 52e is reflected by the beamsplitter configuration 20, and is designated as light ray 52h. The light ray 52h, generally colinear to the light ray 50h, exits the first prism 12 via transmission by the first surface 14, and is designated as light ray 52i, whereupon the light ray 50i reaches the second detector 38. When the light ray 52h is incident to the surface 14 at an oblique angle, the light ray 52h is refracted upon exiting the prism 12 such that the light ray 52i propagates at an angle of γ (relative to the normal to the surface 14).

It is noted that similar to the propagation from the source of light 34 to the detector 36, a pair of coherent output beams (schematically represented by the light rays 50i and 52i) is generated from the single incident beam (light ray 50a/52a) due to the propagation through the prism assembly 30 along two different optical paths. This pair of coherent output beams reaches the second detector 38, and are separated by a lateral shear distance (not shown in the drawings).

Although not shown in the drawings, a lens arrangement may be deployed in the optical path between the surface 14 and the second detector 38 so as to focus the light rays exiting the first prism 12 (e.g., the light rays 50*i* and 52*i*) onto the detector 36

It is noted that the light that follows the third optical path is transmitted by the beamsplitter configuration 20 twice, but is not reflected by the beamsplitter configuration 20. Conversely, the light that follows the fourth optical path is reflected by the beamsplitter configuration 20 twice, but is not transmitted by the beamsplitter configuration 20. The imbalance between reflection and transmission for these two optical paths results in a smaller intensity modulation than the intensity modulation of light following the optical paths illustrated in FIGS. 6-8.

Since the wavefront corresponding to the light ray 50*i* undergoes two transmissions by the beamsplitter configuration 20, the amplitude $B_1$ of the emerging wavefront can generally expressed as:

$$B_1 = t^2 * A,$$

and similarly, since the wavefront corresponding to the light ray 52*i* undergoes two reflections by the beamsplitter configuration 20, the amplitude $B_2$ of the emerging wavefront can generally expressed as:

$$B_2 = r^2 * A.$$

When these two wavefronts are in-phase, the resulting light intensity on the detector 36 is maximum, and can be expressed as:

$$I'_{max} = (B_1 + B_2)^2 = (r^2 + t^2)^2 * A^2.$$

When these two wavefronts are out-of-phase, the resulting light intensity on the detector 36 is minimum, and can be expressed as:

$$I'_{min} = (B_1 - B_2)^2 = (r^2 - t^2)^2 * A^2.$$

The intensity modulation M' of the interferogram is expressed as:

$$M' = 2 * \frac{I'_{max} - I'_{min}}{I'_{max} + I'_{min}} = 4 \frac{r^2 * t^2}{r^4 + t^4}$$

Assuming that the beamsplitter configuration 20 is not an ideal 50%-50% beamsplitter (i.e., that the proportion of light that is reflected by the beamsplitter surface is not exactly equal to the proportion of light that is transmitted by the beamsplitter surface), the following inequality is true:

$$(r^2 - t^2)^2 > 0.$$

Expanding and simplifying the expression in parenthesis yields the following inequality:

$$\frac{r^2 * t^2}{r^4 + t^4} < \frac{1}{2}$$

which when substituted into the expression for M' yields the following inequality:

$$M' < 4 * \frac{1}{2} = 2 = M.$$

As a result, for a non-ideal beamsplitter, the intensity modulation of light following the optical paths illustrated in FIGS. 10 and 11 is less than the intensity modulation of light following the optical paths illustrated in FIGS. 6-8. In general, the modulation is related to the dynamic range of the interferogram because the spectral information of interest is contained primarily in the relative amount of signal variation with respect to its average. The relative signal variation is maximized when the minimum light intensity is identically zero (as in the case that is described with reference to FIGS. 6-8). When minimum light intensity is not identically zero (as in the case that is described with reference to FIGS. 10 and 11), the intensity modulation is reduced, resulting in a loss of some of the spectral information carried in the signal variations of the interferogram.

As previously mentioned, the use of the second detector 38 enables gathering of "lost rays" to produce an additional interferogram that can be averaged with the interferogram corresponding to the light rays 50*e* and 52*e*. The ability to capture these "lost rays" can improve the overall sensitivity of the optical device 10. In contrast, in most conventional interferometers the "lost rays" are typically directed back toward the source and cannot be captured by an additional detector. It is noted, however, that instead of using the second detector 38 to capture "lost rays", an absorber material may be positioned in place of the second detector 38 to prevent ghost rays, due to unwanted reflections, from reaching the primary detector 36.

In addition, the second optical channel through which the "lost rays" propagate can also be exploited to support high-accuracy radiometric and/or wavelength calibration, for example by deploying one or more specialized sources (e.g., monochromatic or wideband light sources) at the exit side of the prism assembly 30 (i.e., at or near the surface 24).

Figure 12:
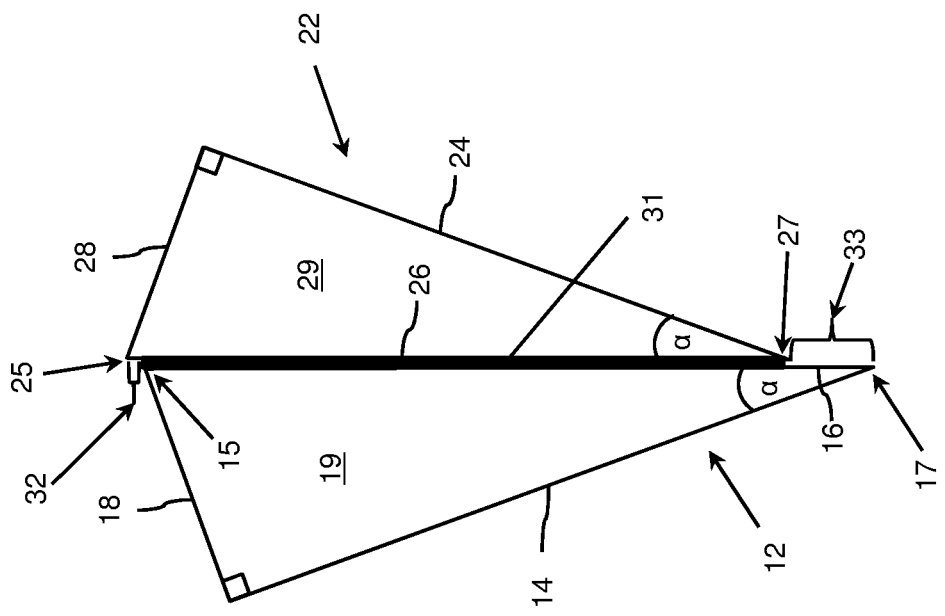
FIG. 12 is a schematic plan view of an optical device having two prisms and a beamsplitter deployed therebetween, with one of the prisms being a scaled version of the other prism and the two prisms translated one with respect to the other, constructed and operative according to another embodiment of the present invention.
Figure 13:
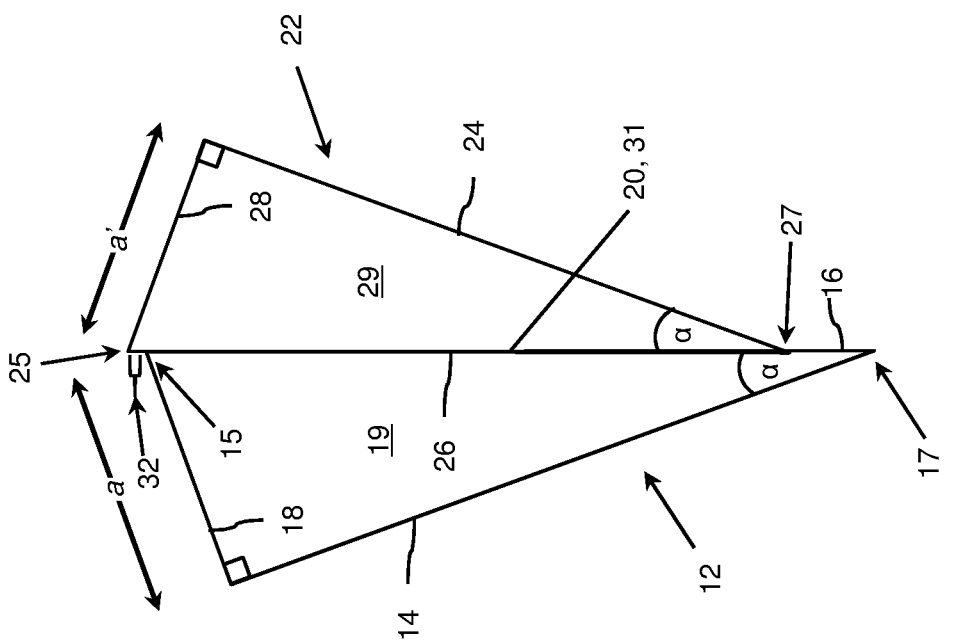
FIG. 13 is a schematic exploded plan view to show the details of the interface region between the prisms of FIG. 12.
Figure 14:
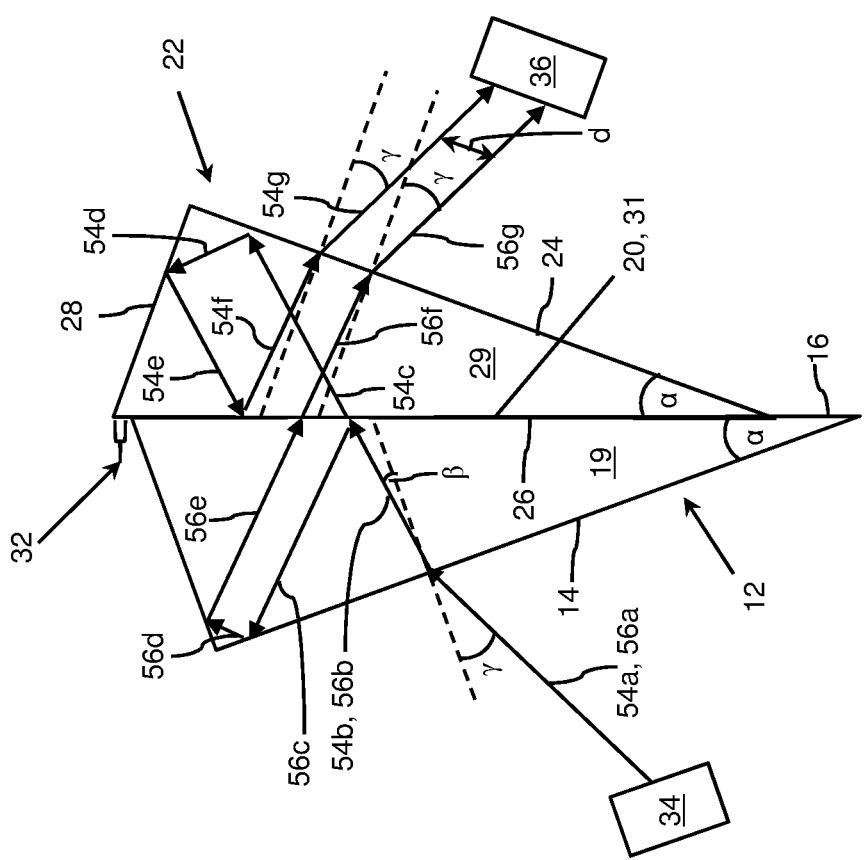
FIG. 14 is a schematic plan view of the optical device of FIG. 12, modified to show a source of light and a detector and sample rays traversing the prisms along two optical paths.

As previously discussed, the formation of the interferometric optical device from two identical triangular prisms that are shifted, one with respect to the other, by an offset amount, promotes a relationship between the OPD and the angle of incidence of light (from the source of light 34) to the entrance surface of the prism assembly. It is particularly desirable that this relationship be a linear relationship—or as close to a linear relationship as possible—such that the OPD varies as a linear function (or nearly linear function) of the incident angle. In the case of near linearity, the maximum OPD value, which in interferometry determines the achievable spectral resolution of the optical system, is achieved at the largest angle of incidence as measured with respect to the normal to the first surface. In order to achieve this linear or near linear functional relationship between OPD and incident angle, embodiments are contemplated in which one of the prisms is a scaled and shifted version of the other prism. FIGS. 12-14 illustrate various views of an optical device according to such embodiments.

Referring first to FIG. 12, there is shown a schematic plan view of an optical device formed from two geometrically similar prisms 12, 22 having a beamsplitter configuration 20 deployed therebetween. The structure of the optical device of FIG. 12 is nearly identical to the structure of the optical device illustrated in FIGS. 1-11 except that in the present embodiment the second prism 22 is a scaled-down and mirrored version of the first prism 12. Here, the front surface 29 (and its opposing rear surface) of the second prism 22 is uniformly scaled-down (in two dimensions) relative to the front surface 19 of the first prism 12, and the surfaces 24, 26, 28 are scaled-down (preferably in one dimension) relative to the corresponding surfaces 14, 16, 18. In particular, the surfaces 24, 26, 28 are preferably scaled only along the dimension of the respective edges formed between the respective surfaces 24, 26, 28 and the front surface 29 such that the prisms 12 and 22 have the same thickness (i.e., such that the surfaces 19 and 29 are coplanar, and the two surfaces opposing the surfaces 19 and 29 are coplanar).

Due to the property of geometric similarity, the two prisms 12, 22 have identical internal angles and the length of each of the three main surfaces of one of the prisms is a scalar multiple of the length of the corresponding main surface of the other prism. In the present embodiment, the length of the third surface 18 (measured in the dimension spanned by the edge formed by the surfaces 18 and 19) is arbitrarily labeled a, and the length of the third surface 28 (measured in the dimension spanned by the edge formed by the surfaces 28 and 29) is arbitrarily labeled a', where a is different than a'.

FIG. 13 more clearly shows the interface region 31 of the optical device of FIG. 12. Unlike the interface region of the optical device of FIGS. 1-11, the surfaces 16, 26 of the prism assembly of the present embodiment mutually overlap such that the interface region 31 extends along unequal portions (unequal majority portions in the illustrated example) of the second surfaces 16, 26 along the dimension of the edge that joins together the surface 16 and the surface 19 (and equivalently the edge that joins together the surface 26 and the surface 29). Analogously, the second surfaces 16, 26 mutually overlap such that a minority portion of the surface 16 extends beyond the surface 26 by a first given offset amount 33 and a minority portion of the surface 26 extends beyond the surface 16 by a second given offset amount 32, where the first and second given offset amounts are unequal and are measured in the dimension of the edge that joins together the surface 16 and the surface 19 (and equivalently the edge that joins together the surface 26 and the surface 29). In the particular illustrative example of FIG. 13, the amount by which the surface 16 extends beyond the surface 26 is greater than the amount by which the surface 26 extends beyond the surface 16. By further analogy, the second surfaces 16, 26 mutually overlap such that the edge 25 of the second prism 22 extends beyond the edge 15 of the first prism 12 by the second given offset amount 32 (measured along the dimension of the edge that joins together the surface 16 and the surface 19), and the edge 17 of the first prism 12 extends beyond the edge 27 of the second prism 22 by the first given offset amount 33 (measured along the dimension of the edge that joins together the surface 16 and the surface 19).

FIG. 14 shows the optical device deployed in an optical path between the source of light 34 and the detector 36, and in particular shows the propagation of a beam emitted by the source of light 34 to the detector 36 along first and second optical paths (having corresponding respective first and second optical path lengths) through the prism assembly formed from the prisms 12, 22.

Along the first optical path, the light beam, represented schematically in FIG. 14 as a sample light ray 54a, is incident to the first surface 14 at an incident angle of γ (where the incident angle is measured relative to the normal to the surfaced 14, shown by the dotted line crossing the surface 14). The incident light ray 54a is transmitted by the first surface 14. The transmitted light ray, designated 54b, is refracted (for γ≠0) upon entering the first prism 12 such that it propagates at an angle of ft (measured relative to the normal to the surfaced 14).

The transmitted light ray 54b impinges on the beamsplitter configuration 20 where a proportion of the intensity of the light ray 54b is transmitted by the beamsplitter configuration 20, and is designated as light ray 54c. The transmitted light ray 54c impinges on the first surface 24 of the second prism 22 at an angle greater than the critical angle such that it is totally internally reflected as light ray 54d. The light ray 54d propagates toward the third surface 28 and impinges on the third surface 28 at an angle greater than the critical angle such that it is totally internally reflected as light ray 54e.

The light ray 54e propagates toward the beamsplitter configuration 20 where a proportion of the intensity of the light ray 54e is reflected by the beamsplitter configuration 20, and is designated as light ray 54f. The light ray 54f exits the second prism 22 via transmission by the first surface 24. The transmitted light ray is designated as 54g. When the light ray 54f is incident to the surface 24 at an oblique angle, the light ray 54f is refracted upon exiting the prism 22 such that the light ray 54g propagates at an angle of γ (relative to the normal to the surface 24), whereupon the transmitted light ray 54g reaches the detector 36.

Along the second optical path, the light beam, represented schematically in FIG. 14 as a sample light ray 56a (which is the same as the light ray 54a), is incident to the first surface 14 at an incident angle of γ, and is transmitted by the first surface 14. The transmitted light ray, designated 56b (which is the same as the light ray 54b), is refracted (for γ≠0) upon entering the first prism 12 such that it propagates at an angle of β.

The transmitted light ray 56b impinges on the beamsplitter configuration 20 where a proportion of the intensity of the light ray 56b is reflected by the beamsplitter configuration 20, and is designated as light ray 56c. The reflected light ray 56c impinges on the first surface 14 of the first prism 12 at an angle greater than the critical angle such that it is totally internally reflected as light ray 56d. The light ray 56d propagates toward the third surface 18 and impinges on the third surface 28 at an angle greater than the critical angle such that it is totally internally reflected as light ray 56e.

The light ray 56e propagates toward the beamsplitter configuration 20 where a proportion of the intensity of the light ray 56e is transmitted by the beamsplitter configuration 20, and is designated as light ray 56f. The light ray 56f exits the second prism 22 via transmission by the first surface 24. The transmitted light ray is designated as 56g. When the light ray 56f is incident to the surface 24 at an oblique angle, the light ray 56f is refracted upon exiting the prism 22 such that the light ray 56g propagates at an angle of γ (relative to the normal to the surface 24), whereupon the transmitted light ray 56g reaches the detector 36.

As should be apparent from the description of the traversal of light rays corresponding to FIG. 14, light rays traversing the optical path through the prism assembly 30 enter the first prism 12 and exit the second prism 22 at the same angle γ.

It is noted that the same options discussed above, pertaining to the use of a specular or an ASR coating instead of, or in combination with, construction of the prisms 12, 22 from an appropriately high index material, are applicable here. It is further noted the order of reflection from the surfaces 24, 28 and the surfaces 14, 18 may be reversed, similar to as previously discussed, by adjusting the position of the source of light 34 such that the light rays 54b, 56b impinge on the beamsplitter configuration 20 at a region closer to the upper portion of the interface region 31. Finally, it should be apparent that the optical device of the present embodiment (FIGS. 12-14) can also be used in combination with a second detector 38 (associated with the first surface 14) and/or as part of the optical system 100 illustrated in FIG. 9.

Although the configuration illustrated in FIGS. 12-14 shows the smaller prism placed higher than the larger prism, other configurations are possible in which the larger prism is placed higher than the smaller prism.

Figure 19:
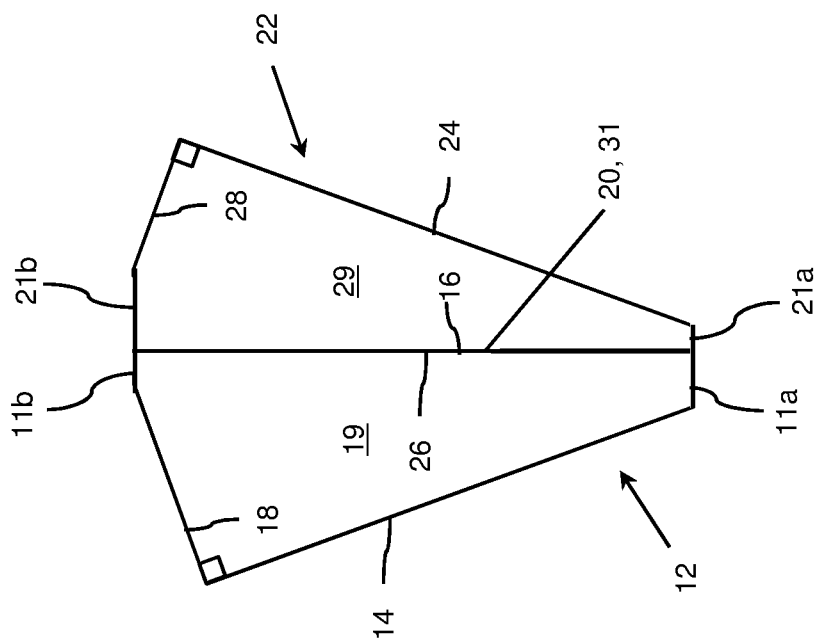
FIG. 19 is a schematic plan view of an optical device, based on the optical device of FIG. 12, having cut-off corners.

Parenthetically, in all of the examples described and illustrated in this document, the corners relating to the apex angle α and to the opposite corner near the edges 15, 25, can be absent, meaning that the prisms 12, 22 can be cut (removing at least the portions of the prism 12/22 which extends beyond the prism 22/12), as long as this absence does not interfere with the path of the beams inside the prisms. FIG. 19 illustrates an example of such an optical device having cut-off corners, based on the optical device of FIG. 12. Here, the corners relating to the apex angle α of the prisms 12 and 22 are cut-off (by a single cut), resulting in an additional surface 11a of the prism 12 that extends between the surfaces 12 and 16, normal to the plane of the beamsplitter configuration 20, and an additional surface 21 of the prism 22 that extends between the surfaces 24 and 26, normal to the plane of the beamsplitter configuration 20. The non-apex corners of the prisms 12 and 22 that are close to the beamsplitter configuration 20 are also cut-off (by a single cut), resulting in an additional surface 11b of the prism 12 that extends between the surfaces 16 and 18, normal to the plane of the beamsplitter configuration 20, and an additional surface 21b of the prism 22 that extends between the surfaces 26 and 28, normal to the plane of the beamsplitter configuration 20. As mentioned, the prisms 12 and 22 may be cut so long as the removal of the cut-off portions does not interfere with the path of beams inside the prism assembly 30. Specifically, the portions of the surfaces 14, 18, 24 and 28 removed by the cutting should not include the regions of those surfaces which reflect light during propagation through the prism assembly 30. Although FIG. 19 illustrates the optical device of FIG. 12 with cut-off corners, it should be clear that similar corner cut-off principles can be applied to the various other optical devices described and illustrated in this document. It is also noted that the prisms 12 and 22 may be cut prior to formation of the unitary prism assembly 30, or may be cut after the unitary prism assembly 30 has been formed.

The following paragraphs describe design considerations of the optical device of the various embodiments of the present disclosure which enable achieving an OPD that is a function of the sine of the incident angle γ, and in particular is proportional to sin γ. As a result, in these configurations the OPD will be equal to 0 when γ=0. On this basis, it is therefore also possible to identify the condition needed to cause the OPD to be equal to zero for an incident angle different from zero.

Assuming that the prisms 12, 22 are constructed from a material having a refractive index of η, and the prism assembly is deployed in a medium having refractive index of 1 (e.g., air), the relationship between the incident angle γ and the refracted angle β is given by:

$$\eta = \frac{\sin \gamma}{\sin \beta}$$

Generally speaking, there are two contributions to the OPD for any pair of coherent beams that reach the detector 36 along two different optical paths. The first contribution can be attributed to the traversal of the two beams through the prism assembly, and the second contribution is attributed to the "lateral shear" between the two beams. As previously mentioned, the "lateral shear" is generally defined as the distance (measured parallel to the direction of the edge joining planes 24 and 29) between the two beams at the exit of the prism assembly (e.g., the distance between the spaced apart parallel rays 50g and 52g in FIGS. 6-8). In drawings (FIGS. 8 and 14), the lateral shear is designated as d. Parenthetically, lateral shear is also present in embodiments in which the prisms 12, 22 are non-right-angled prisms.

The OPD contribution from traversing the prism assembly is denoted as $OPD_P$, and is expressed as:

$$OPD_P = 2 * \eta * \frac{(a-a') * \cos 2\alpha - b * \sin \alpha}{\cos \beta}$$

where b is the given offset amount 32.

The OPD contribution from the lateral shear d is denoted as $OPD_S$, and is expressed as:

$$OPD_S = -d * \sin \gamma$$

It turns out that the lateral shear d does not depend on the incident angle γ, and only depends on the geometry and the offset amount of the prisms 12, 22. Specifically, the lateral shear d can be expressed as:

$$d = 2 * \{b * \cos \alpha + (a-a') * \sin 2\alpha\}$$

The total OPD, denoted as $OPD_T$, is given by the sum of the two OPD contributions, i.e., $OPD_T$ is expressed as:

$$OPD_T = OPD_P + OPD_S$$

For the optical device of FIGS. 1-11, the two prisms 12 and 22 are of the same size, and therefore a=a'. Thus, the above expression for the lateral shear can be simplified to:

$$d = 2 * b * \cos \alpha.$$

Accordingly, for the particular case of two identically sized prisms having an offset amount 32, the lateral shear is a function of the offset amount 32 (given as b), and the apex angle α of the constituent prisms 12, 22. Thus, the OPD contribution from the lateral shear can be expressed as:

$$OPD_S = -2 * b * \cos \alpha * \sin \gamma$$

In addition, the above expression for the OPD contribution from traversing the prism assembly 30 of FIGS. 1-11 can be simplified (by setting a=a') to:

$$OPD_P = -2 * \eta * b * \frac{\sin \alpha}{\cos \beta} = -2 * \eta * b * \sin \alpha \Big/ \cos\left[\mathrm{asin}\left(\frac{\sin \alpha}{\eta}\right)\right]$$

Thus, the total OPD, given by the sum of OPD and $OPD_S$, for the optical device of FIGS. 1-11 can be expressed as:

$$OPD_T = -2 * \eta * b * \frac{\sin \alpha}{\cos\left[\mathrm{asin}\left(\frac{\sin \gamma}{\eta}\right)\right]} - 2 * b * \cos \alpha * \sin \gamma$$

which is a function of sin γ. Here, the OPD is obviously ≠0 when γ=0, because then only the second term of the equation is equal to zero. In addition, in the previous equation, the $OPD_T$ may in general not be equal to 0 for any value of γ. In fact, for example for $OPD_T$ to be zero, the following relationship should hold:

$$\sin\gamma * \cos\left[\operatorname{asin}\left(\frac{\sin\gamma}{\eta}\right)\right] = -\eta\tan\alpha$$

The right-hand side of the above expression is negative, so the equality can be satisfied only if $\gamma$ is negative (since $-90° < \gamma < 90°$). However, although for $0° > \gamma > -90°$ the left-hand side of the above expression is negative, it is always larger than $-0.826$, while for $a=22.5°$ and $\eta=2.4$ (e.g., for ZnSe), the right side of the equation is negative and is equal to approximately $-0.9941$. As a result, in this case, the $OPD_T$ never becomes 0 for any incident angle $\gamma$. The same situation can be proved to hold in general also if the two prisms are not the same size but the offset amount is zero.

For the optical device of FIGS. 12-14, the simplified expressions for OPD and $OPD_S$ do not hold, since $a \neq a'$. In this case, it turns out that in general there is a set of geometric parameters of the prisms 12, 22 and the offset amount between them for which OPD is equal to 0 without nulling $OPD_S$. It follows that in this case $OPD_T$ is equal to $OPD_S$, and therefore is proportional to $\sin \gamma$. This case is preferable when double sided and symmetric interferograms are desired, where the total OPD can take positive and negative values and takes a value of zero in the central field of view angle of the optical system.

To find the proper conditions for this to happen, the equation for OPD is set to 0, resulting in the following expression:

$$b = \frac{(a-a') * \cos 2\alpha}{\sin \alpha}$$

By substituting the expression for b (the second given offset amount 32) into the expression for the lateral shear d, and using appropriate trigonometric identities, the expression for lateral shear d can be written as:

$$d = 2 * \left\{ \frac{(a-a') * \cos 2\alpha}{\sin \alpha} * \cos \alpha + (a-a') * \sin 2\alpha \right\}$$

which can be simplified to:

$$d = 2 * (a-a') * \left( \sin 2\alpha + \frac{\cos 2\alpha * \cos \alpha}{\sin \alpha} \right)$$

Using the double angle identities for sine and cosine, the expression for the lateral shear d can ultimately be reduced to:

$$d = 2*(a-a')*\cot \alpha$$

As should be apparent, the lateral shear d in these expressions could be identically equal to 0 (meaning that the light rays 54g and 56g are not only parallel, but are also colinear) in two cases: 1) when the prisms 12, 22 are identical in size (i.e., $a=a'$), and/or 2) when $\alpha$ is 90°. However, this is not the case by definition, because the prisms 12, 22 in FIGS. 12-14 are of different size (i.e., $a \neq a'$), and the angle $\alpha$ is the apex angle and is by definition less than 90°.

Accordingly, in order to achieve a double sided interferogram (where negative OPD values are included in the interferogram) or at least an interferogram in which the OPD is equal to 0 for some incident angle $\gamma$, the two prisms 12, 22 are of unequal size and translated one with respect to the other whereby none of the edges 15, 17 of the first prism 12 are aligned with the corresponding edges 25, 27 of the second prism 22. By appropriate choice of the values of b, a and a' (according to the previously defined relationship between b and a, a', or approximately according to that relationship), an OPD value of 0 is achievable for $\gamma=0$. More precisely, in conclusion, if $$b = \frac{(a-a') * \cos 2\alpha}{\sin \alpha},$$

or equivalently, if the ratio $$\frac{b}{a-a'} = \cos 2\alpha / \sin \alpha,$$

then, $$OPD_T = OPD = -d*\sin \gamma = -2*(a-a')*\cot \alpha * \sin \gamma.$$

This expression of $OPD_T$, a-a' being different than 0, is zero only for $\gamma=0$ and takes positive and negative values for $\gamma$ varying around 0. $OPD_T$ can be made to take the zero value for different values of $\gamma$, by slightly varying the ratio of $$\frac{b}{a-a'}$$

above.

It is noted that spectroscopic applications often rely on the use of double side interferograms because the full radiation intensity information is carried in the value of the interferogram at OPD=0. However, some spectral information is still available even when the full radiation intensity information is absent. Accordingly, there is potential value in modifying the optical device of FIGS. 12-14 to assume a configuration in which the prisms 12, 22 are either the same size and not translated one with respect to the other, or are translated and not the same size, such that an OPD value of 0 is not achievable. It is reiterated here that the case of two constituent prisms of the same size and no translation does not give rise to any OPD for any angle of incidence.

By way of illustration of one such particular configuration of the prisms 12, 22, FIGS. 15-17 show an optical device similar to the optical device described with respect to FIGS. 12-14, but in which the prisms 12, 22 are not translated one with respect to the other. Specifically, the interface region 31 extends along the entirety of the length (measured in the dimension of the edge that joins together the surface 16 and the surface 19) of one of the surfaces 16, 26 (the surface 26 in the illustrative example), and extends along the majority of the length of the other of the surfaces 16, 26 (the surface 16 in the illustrative example). Analogously, the second surfaces 16, 26 mutually overlap such that a minority portion of the surface 16 extends beyond the surface 26 by a given offset amount 32 in the dimension of the edge that joins together the surface 16 and the surface 19, but the surface 26 does not extend beyond the surface 16.

FIGS. 15 and 16 show a configuration in which the second surfaces 16, 26 mutually overlap such that the edge 17 of the first prism 12 extends beyond the edge 27 of the second prism 22 by the given offset amount 32 (measured along the dimension of the edge that joins together the surface 16 and the surface 19), but the edges 15 and 25 are mutually aligned. FIG. 17 illustrates a configuration similar to the configuration of FIGS. 15 and 16, but with the translation in the opposite direction. Specifically, in the configuration illustrated in FIG. 17, the second surfaces 16, 26 mutually overlap such that the edge 15 of the first prism 12 extends beyond the edge 25 of the second prism 22 by the given offset amount 32 (measured along the dimension of the edge that joins together the surface 16 and the surface 19), but the edges 17 and 27 are mutually aligned.

It is noted that each of the configurations of the optical devices illustrated in FIGS. 1-17 has a corresponding symmetric configuration in which the source of light 34 and the detector 36 positions are swapped such that the surface 24 is associated with the source of light 34 (and the second detector 38), and the surface 14 is associated with the detector 14.

As should be apparent, the various configurations of the prism assembly 30 described herein are all variants of each other, and one configuration can be achieved from another configuration by making appropriate changes to some of the parameters of the constituent prisms and the size of the interface region. For example, the configuration of the prism assembly 30 illustrated in FIG. 12 can be achieved from the configuration of the prism assembly 30 illustrated in FIG. 3 by making the lengths of the surfaces 18 and 28 unequal (i.e., a≠a'). Similarly, the configuration of the prism assembly 30 illustrated in FIG. 3 can be achieved from the configuration of the prism assembly 30 illustrated in FIG. 12 by setting the lengths of the surfaces 18 and 28 to be equal to each other (i.e., a=a'). Similarly, the configuration of the prism assembly 30 illustrated in FIG. 15 can be achieved from the configuration of the prism assembly 30 illustrated in FIG. 3 by making the lengths of the surfaces 18 and 28 unequal (i.e., a≠a') and appropriately adjusting the size of the interface region.

As discussed throughout the present document, some of the drawings, notably FIGS. 6-8, 10, 11 and 14, illustrate schematic representations of light propagation through the prism assembly 30 by way of light ray tracing. Although the light rays have been illustrated in an effort to accurately show angles of incidence, reflection, and refraction associated with the light rays, it should be clear that these schematic representations are intended to help illustrate how the beamsplitter configuration 20 and the prisms 12, 22 deflect incident light originating from a source, and that the angles of incidence, reflection, and refraction gleaned from the drawings may not be precise. One of ordinary skill in the art will appreciate that the light propagating through the prism assembly 30 will undergo refraction and reflection at angles from the various prism surfaces and the beamsplitter configuration in accordance with the underlying physical principles of refraction and reflection (e.g., total internal reflection, beamsplitter reflection, etc.).

The embodiments of the present disclosure have thus far been described with consideration of parallel light rays incident on the prism assembly 30 which lay in a plane that is parallel to the planar surface 19 (and the surface 29). If the detector 36 is a point detector or a multiple element linear detector lying also on the plane of the paper, all of the spectral information can be gathered by scanning the γ angles (in case of a point detector), or by storing the signals from all the detector elements (in the case of the line detector), by imaging these parallel rays on the detector(s) through a lens or a set of lenses appropriately focusing the incoming rays from infinity. However, if the detector 36 is a two-dimensional multiple element detector with a detector surface perpendicular to the plane of the paper, with first sets of detector element lines lying parallel to the plane of the paper, the orthogonal detector element lines perpendicular to the first sets of detector element lines and having elements lying outside the plane of the paper, the elements of the orthogonal detector element lines will receive sets of parallel skew rays through the focusing lens system. These parallel skew rays travel in directions which are not parallel to the plane of the paper. It turns out that the component of a skew ray parallel to the plane of the paper propagates through the interferometer (the prism assembly 30) and contributes to the signal of the detector element onto which the ray is focused in the same way as described in the above treatment according to the appropriate projected γ angle. Especially in the cases analyzed above of $OPD_T$ going through 0 at γ=0 or at γ close to 0, the $OPD_T$ is a substantially fast varying function of γ (first order in γ). In contrast, the component of the skew ray which is perpendicular to the plane of the paper is expected to contribute a much slower variation of $OPD_T$ with the γ' angle, defined as the projected angle of the skew ray with respect to a direction perpendicular to the plane of the paper. The result of this fact is that the detector elements of a two-dimensional detector will carry most of the spectral information in the direction parallel to the plane of the paper, and almost no spectral information in a direction perpendicular to the plane of the paper (while all of the detector elements carry equally the spatial information from the different directions of the incoming rays).

It is noted that in the previously described embodiments, for each of the surfaces 14 and 24 only a specific region of the surface reflects light during propagation through the prism assembly 30, and only a specific region of the surface couples light into and out of the prism assembly 30. In general, the light coupling regions and light reflecting regions of the surfaces 14 and 24 are non-overlapping, such that the regions of the surfaces 14 and 24 at which light respectively enters and exits the prism assembly 30 are non-overlapping with the regions of the surfaces 14 and 24 at which propagating light undergoes reflection (either by total internal reflection from the surfaces 14, 24 or via an ASR or specularly reflecting coating applied to the surfaces 14, 24). Furthermore, for each of the surfaces 18 and 28, only a specific region of the surface reflects light (either by total internal reflection from the surfaces 18, 28 or via an ASR or specularly reflecting coating applied to the surfaces 18, 28) during propagation through the prism assembly 30.

Figure 18:
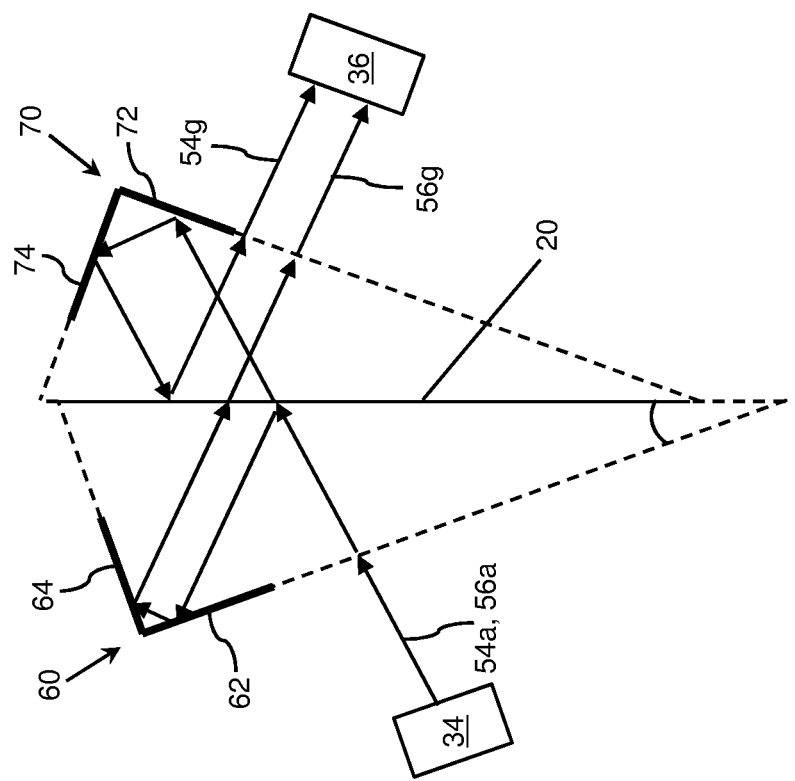
FIG. 18 is a schematic plan view of an optical device similar to the optical device of FIG. 14, but with the solid material of the prisms replaced with air.

Embodiments are contemplated herein in which the non-light reflecting regions of the surfaces 14, 18, 24, 28 are replaced with air, and the light reflecting regions are replaced with reflective surfaces. An example of an interferometer configuration based on the configuration illustrated in FIG. 14 is depicted in FIG. 18. The interferometer is composed of two mirror assemblies 60 and 70 and a beamsplitter configuration 20. Each of the mirror assemblies 60, 70 has a corresponding pair of generally planar reflective surfaces that form a right-angle (although other embodiments are considered for non-right-angled mirror assemblies). Specifically, the mirror assembly 60 includes a pair of reflective surfaces 62 and 64, and the mirror assembly 70 includes a pair of reflective surfaces 72 and 74. The dashed lines in FIG. 18 demarcate the extensions of the planes of the reflective surfaces 62, 64, 72, 74 and the beamsplitter configuration 20 (i.e., the regions at which light does not undergo any reflections).

In general, the size of, and the positional relations between, the reflective surfaces 62, 64, 72, 74 and the beamsplitter configuration 20 is the same as the light reflecting regions and the used portion of the beamsplitter configuration 20 of FIG. 14, except that in the present embodiment the solid material of the prisms is removed and replaced with air to form an "air prism". Specifically, the light reflecting regions of the respective surfaces 14, 18, 24, 28 of the prism assembly 30 of FIG. 14 are replaced by the reflective surfaces 62, 64, 72, 74 in the present embodiment. In addition, the light coupling regions of the surfaces 14, 24 and the non-light reflecting regions of the surfaces 18, 28 of the prism assembly 30 of FIG. 14 are replaced with air in the present embodiment.

The following paragraphs further describe the positional relations between the surfaces 62, 64, 72, 74 and the beamsplitter configuration 20 in the context of FIG. 18. Generally speaking, the mirror assemblies 60, 70 and the beamsplitter configuration 20 are deployed such that the planes of the reflective surfaces 62, 64 and the beamsplitter configuration 20 intersect to form a first prismatic structure ("air prism") having a triangular shape in the plane of the paper. The plane of the reflective surface 62 and the plane of the beamsplitter configuration 20 intersect to form the apex angle of the triangular "air prism". The planes of the reflective surfaces 72, 74 and the beamsplitter configuration 20 intersect to form a second prismatic structure ("air prism") having a triangular shape in the plane of the paper. The plane of the reflective surface 72 and the plane of the beamsplitter configuration 20 intersect to form the apex angle of the triangular "air prism".

The triangles formed by the aforementioned planar intersections are offset one with respect to the other and scaled one with respect to the other (just as in the configuration described with respect to FIG. 14). A point on the line of intersection between the plane of the beamsplitter configuration 20 and the plane of the reflective surface 74 extends beyond a colinear point on the line of intersection between the plane of the beamsplitter configuration 20 and the plane of the reflective surface 64 by a first given offset amount. Optionally, or in addition, a point on the line of intersection between the plane of the beamsplitter configuration 20 and the plane of the reflective surface 62 extends beyond a colinear point on the line of intersection between the plane of the beamsplitter configuration 20 and the plane of the reflective surface 72 by a second given offset amount (that may be the same as or different from the first given offset amount).

Alternatively, a point on the line of intersection between the plane of the beamsplitter configuration 20 and the plane of the reflective surface 64 extends beyond a colinear point on the line of intersection between the plane of the beamsplitter configuration 20 and the plane of the reflective surface 74 by a first given offset amount. Optionally, or in addition, a point on the line of intersection between the plane of the beamsplitter configuration 20 and the plane of the reflective surface 72 extends beyond a colinear point on the line of intersection between the plane of the beamsplitter configuration 20 and the plane of the reflective surface 62 by a second given offset amount (that may be the same as or different from the first given offset amount).

It is noted that incident light to the configuration illustrated in FIG. 18 follows a light propagation path similar to as described with reference to FIG. 14, however, since the mirror assemblies 60, 70 and the beamsplitter configuration 20 are deployed in air (refractive index of 1), incident light does not undergo refraction upon entering or exiting the "air prism". As such, the optical paths traversed by an incident beam from the source of light to the detector (and optionally the second detector) are equivalent to the respective geometrical paths (since the optical path is generally defined as the geometrical path multiplied by the refractive index).

Figure 3:
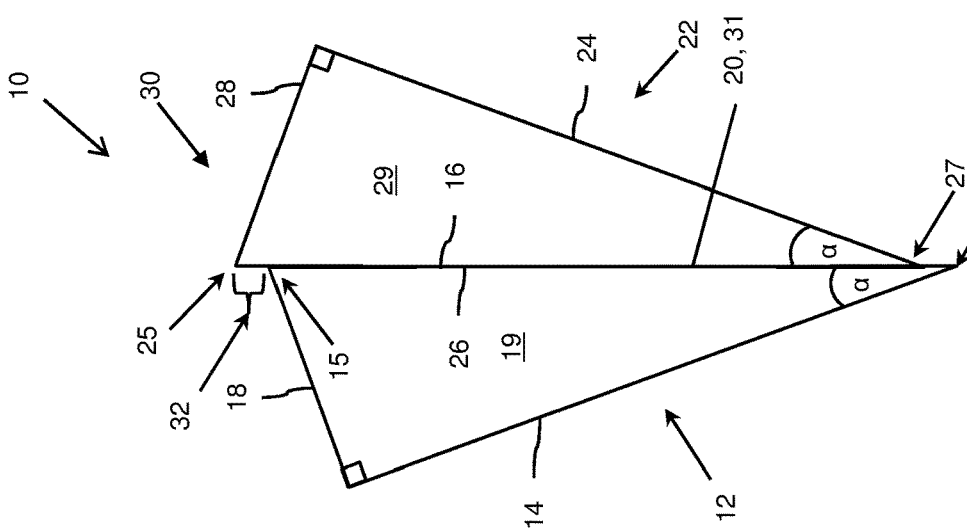
FIG. 3 is a plan view of the optical device of FIG. 1.

As should be apparent to one of ordinary skill in the art, the replacement of the light reflecting regions with reflective surfaces, and the replacement of the non-light reflecting regions with air, can equally be applied to other prism assembly 30 configurations described herein, for example the configurations described with reference to FIGS. 3, 15 and 17. All the equations describing the behavior of the total OPD versus incidence angle of the incoming rays will hold by setting the parameter $\eta$ equal to 1.

It is noted that one advantage of the aforementioned "air prism" embodiments is that the air prisms require a relatively small amount of solid material, and are therefore cheaper to manufacture as compared to their solid material prism counterparts.

It is noted herein, and with reference to the ray traversal diagrams (e.g., FIGS. 6-8, 10, 11 and 14), that the incoming light rays 50a or 54a are representative of a respective parallel bundle of rays which form the respective plane wavefront. Each of these bundles has a cross section defined by collecting optics of the system in which the interferometer (optical device 10) is operative. The region of first surface 14 through which the bundles enter the interferometer from different directions, and which is the intersection of this surface 14 with the various bundles' cross sections, is arbitrary, as long as the various reflections and beamsplitter traversals take place according to the explanations above. It has become apparent to the inventors that there is a preferred region of entrance which can be used to minimize the size of the interferometer, at equal beam cross section and range of entrance angles, so as to provide a reduced overall form factor of the optical device. This preferred region is the region opposite to the upper corner of the prism 22 (the intersection between surfaces 24 and 28). This region is preferred because in the configurations described herein, the largest portion of the prism 22 on the side of the smaller apex angle (the intersection between surfaces 24 and 26) can be removed, resulting in a smaller interferometer in terms of volume and weight. For bundles entering the prism 12 in the preferred region, and normal to the first surface 14, the light rays which compose the bundles are transmitted by the beamsplitter configuration 20. For each of the transmitted rays, a first portion of the transmitted ray impinges on the surface 24 of the prism 22, and a second portion of the transmitted ray impinges on the surface 28 of the prism 22.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical device comprising:
   a prism assembly including:
      a first prism comprising a light-transmitting material having a plurality of surfaces including at least a first surface associated with a source of light and a second surface oblique to the first surface, and
      a second prism comprising a light-transmitting material having a plurality of surfaces including at least a first surface associated with a detector and a second surface oblique to the first surface of the second prism, wherein the second surface of the first prism is in overlapping relation with the second surface of the second prism to define an interface region of a given length that partially extends along at least one of the second surface of the first prism or the second surface of the second prism, and wherein the first and second prisms are optically attached at the interface region; and
   a beamsplitter configuration overlying the interface region,
   wherein an incoming light beam emitted by the source of light is transmitted by the beamsplitter configuration and is subsequently reflected by the beamsplitter configuration so as to propagate through the prism assembly along a first optical path to the detector, and wherein the incoming light beam is reflected by the beamsplitter configuration and is subsequently transmitted by the beamsplitter configuration so as to propagate through the prism assembly along a second optical path to the detector, such that the incoming light beam reaches the detector as two coherent light beams, and wherein the plurality of surfaces of the first prism further includes a third surface, and wherein the plurality of surfaces of the second prism further includes a third surface, and wherein light beams that propagate from the source of light to the detector along the first optical path are reflected once from each of the first and third surfaces of the second prism, and wherein light beams that propagate from the source of light to the detector along the second optical path are reflected once from each of the first and third surfaces of the first prism.

2. The optical device of claim 1, wherein a difference between a length of the first and second optical paths varies as a function of an angle of incidence of the incoming light beam.

3. The optical device of claim 1, wherein the source of light is a remote scene that emits radiation.

4. The optical device of claim 1, further comprising:
   a detector arrangement corresponding to the detector associated with the first surface of the second prism.

5. The optical device of claim 1, further comprising:
   a scanning arrangement configured to change an angle of incidence of light beams, emitted by the source of light, on the first surface of the first prism.

6. The optical device of claim 1, wherein at least some of the reflections of the light beams from the first and third surfaces of the first or second prism are reflections by total internal reflection.

7. The optical device of claim 1, wherein the light-transmitting material of the first and second prisms have a refractive index greater than a refractive index of a medium in which the prism assembly is deployed so as to define a critical angle such that light beams that propagate along the first and second optical paths that are incident on the first and third surfaces of the first and second prisms at angles greater than the critical angle are reflected from the first and third surfaces of the first and second prisms by total internal reflection.

8. The optical device of claim 1, wherein the first surface of the first prism is further associated with a second detector, and wherein light beams emitted by the source of light propagate through the first and second prisms along a third optical path and a fourth optical path so as to reach the second detector as two coherent light beams, and wherein light beams that propagate from the source of light to the second detector along the third optical path are reflected from the beamsplitter configuration exactly twice and are not transmitted by the beamsplitter configuration, and wherein light beams that propagate from the source of light to the second detector along the fourth optical path are transmitted by the beamsplitter configuration exactly twice and are not reflected from the beamsplitter configuration.

9. The optical device of claim 8, wherein a difference between a length of the third and fourth optical paths varies as a function of an angle of incidence of the incoming light beam.

10. The optical device of claim 1, wherein each of the first prism and the second prisms has a geometric shape, and wherein the geometric shape of the first prism or the second prism is obtained from the second prism or the first prism by performing at least one of scaling, translating, rotating, or reflecting to the second prism or the first prism.

11. The optical device of claim 1, wherein the first prism is a reflected version of the second prism.

12. The optical device of claim 1, wherein the first surface of the first prism, the second surface of the first prism, and the third surface of the first prism form a first triangle in a plane, and wherein the first surface of the second prism, the second surface of the second prism, and the third surface of the second prism form a second triangle in the plane, and wherein the first prism has a structural relationship to the second prism such that the first triangle is a scaled version of the second triangle.

13. The optical device of claim 1, wherein the interface region extends along a majority portion of the second surface of the first prism and a majority portion of the second surface of the second prism, and wherein the majority portions are equally sized portions.

14. The optical device of claim 1, wherein the interface region extends along a majority portion of the second surface of the first prism and a majority portion of the second surface of the second prism, and wherein the majority portions are unequally sized portions.

15. The optical device of claim 1, wherein the interface region extends along a majority portion of the second surface of the first or second prism, and wherein the interface region extends along the entirety of the second surface of the second or first prism.

16. An optical device comprising:
a prism assembly including:
  a first prism comprising a light-transmitting material having a plurality of surfaces including at least a first surface associated with a source of light and a second surface oblique to the first surface, and
  a second prism comprising a light-transmitting material having a plurality of surfaces including at least a first surface associated with a detector and a second surface oblique to the first surface of the second prism, wherein the second surface of the first prism is in overlapping relation with the second surface of the second prism to define an interface region of a given length that partially extends along at least one of the second surface of the first prism or the second surface of the second prism, and wherein the first and second prisms are optically attached at the interface region; and
a beamsplitter configuration overlying the interface region,
wherein an incoming light beam emitted by the source of light is transmitted by the beamsplitter configuration and is subsequently reflected by the beamsplitter configuration so as to propagate through the prism assembly along a first optical path to the detector, and wherein the incoming light beam is reflected by the beamsplitter configuration and is subsequently transmitted by the beamsplitter configuration so as to propagate through the prism assembly along a second optical path to the detector, such that the incoming light beam reaches the detector as two coherent light beams, and
wherein each of the first prism and the second prisms has a geometric shape, and wherein the geometric shape of the first prism or the second prism is obtained from the second prism or the first prism by performing at least one of scaling, translating, rotating, or reflecting to the second prism or the first prism.

17. An optical device comprising:
a prism assembly including:
  a first prism comprising a light-transmitting material having a plurality of surfaces including at least a first surface associated with a source of light and a second surface oblique to the first surface, and
  a second prism comprising a light-transmitting material having a plurality of surfaces including at least a first surface associated with a detector and a second surface oblique to the first surface of the second prism, wherein the second surface of the first prism is in overlapping relation with the second surface of the second prism to define an interface region of a given length that partially extends along at least one of the second surface of the first prism or the second surface of the second prism, and wherein the first and second prisms are optically attached at the interface region; and
a beamsplitter configuration overlying the interface region,
wherein an incoming light beam emitted by the source of light is transmitted by the beamsplitter configuration and is subsequently reflected by the beamsplitter configuration so as to propagate through the prism assembly along a first optical path to the detector, and wherein the incoming light beam is reflected by the beamsplitter configuration and is subsequently transmitted by the beamsplitter configuration so as to propagate through the prism assembly along a second optical path to the detector, such that the incoming light beam reaches the detector as two coherent light beams, and
wherein the first prism is a reflected version of the second prism.

* * * * *